United States Patent
Choi et al.

(10) Patent No.: US 7,536,029 B2
(45) Date of Patent: May 19, 2009

(54) APPARATUS AND METHOD PERFORMING AUDIO-VIDEO SENSOR FUSION FOR OBJECT LOCALIZATION, TRACKING, AND SEPARATION

(75) Inventors: Changkyu Choi, Seoul (KR); Hyoung-ki Lee, Suwon-si (KR); Sang Min Yoon, Yongin-si (KR); Donggeon Kong, Busan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 797 days.

(21) Appl. No.: 10/998,984

(22) Filed: Nov. 30, 2004

(65) Prior Publication Data

US 2006/0075422 A1 Apr. 6, 2006

(30) Foreign Application Priority Data

Sep. 30, 2004 (KR) .................. 10-2004-0078019

(51) Int. Cl.
*G06K 9/00* (2006.01)
*G06K 9/46* (2006.01)
*H04N 7/14* (2006.01)

(52) U.S. Cl. .................. 382/103; 382/115; 382/181; 382/203; 348/14.04; 348/14.16

(58) Field of Classification Search ................ 382/103, 382/115, 181, 203, 209; 348/169, 14.04, 348/14.16
See application file for complete search history.

(56) References Cited

U.S. PATENT DOCUMENTS

| | | | |
|---|---|---|---|
| 4,947,044 A * | 8/1990 | Pinson ................. | 250/330 |
| 5,040,231 A * | 8/1991 | Terzian ................ | 382/197 |
| 5,206,721 A * | 4/1993 | Ashida et al. ......... | 348/14.1 |
| 5,686,957 A * | 11/1997 | Baker ................. | 348/36 |

(Continued)

FOREIGN PATENT DOCUMENTS

JP 11-41577 2/1999

OTHER PUBLICATIONS

Matsuzawa, Yuki, and Itsuo Kumuzawa. "Object tracking with shape representation network using color information." Image Processing, 2000. Proceedings. 2000 International Conference on 3(2000): 94-97.*

(Continued)

*Primary Examiner*—Matthew C Bella
*Assistant Examiner*—Michael A Newman
(74) *Attorney, Agent, or Firm*—Staas & Halsey LLP

(57) ABSTRACT

An apparatus for tracking and identifying objects includes an audio likelihood module which determines corresponding audio likelihoods for each of a plurality of sounds received from corresponding different directions, each audio likelihood indicating a likelihood a sound is an object to be tracked; a video likelihood module which receives a video and determines video likelihoods for each of a plurality of images disposed in corresponding different directions in the video, each video likelihood indicating a likelihood that the image is an object to be tracked; and an identification and tracking module which determines correspondences between the audio likelihoods and the video likelihoods, if a correspondence is determined to exist between one of the audio likelihoods and one of the video likelihoods, identifies and tracks a corresponding one of the objects using each determined pair of audio and video likelihoods.

60 Claims, 16 Drawing Sheets

U.S. PATENT DOCUMENTS

| | | | | |
|---|---|---|---|---|
| 5,844,599 | A | * | 12/1998 | Hildin ..................... 348/14.1 |
| 5,940,118 | A | * | 8/1999 | Van Schyndel .......... 348/14.05 |
| 6,005,610 | A | * | 12/1999 | Pingali ...................... 348/169 |
| 6,542,621 | B1 | * | 4/2003 | Brill et al. .................. 382/103 |
| 6,593,956 | B1 | * | 7/2003 | Potts et al. .............. 348/14.09 |
| 6,882,746 | B1 | * | 4/2005 | Naveen et al. ............. 382/173 |
| 7,139,767 | B1 | * | 11/2006 | Taylor et al. ............... 707/102 |
| 2003/0103647 | A1 | * | 6/2003 | Rui et al. .................... 382/103 |
| 2004/0252845 | A1 | * | 12/2004 | Tashev ......................... 381/56 |

OTHER PUBLICATIONS

Lathoud, Guillaume, and Ian A. McCowan. "Location Based Speaker Segmentation." Acoustics, Speech, and Signal Processing, 2003. Proceedings (ICASSP '03). 2003 IEEE International Conference on 1(2003): I-176-I-179.*

Schmidt, Ralph O. "Multiple Emitter Location and Signal Parameter Estimation." IEEE Transactions on Antennas and Propagation AP-34 No. 3(1986): 276-280.*

Bennett, Granger H. "Transient Discrimination Using a Subspace Method." IEEE Journal of Oceanic Engineering 28 No. 4(2003): 763-765.*

Chen, Yao, and Patrick Honan, Ufuk Tureli. "Adaptive reduced-rank localization for multiple wideband acoustic sources." Military Communications Conference, 2003. MILCOM 2003. IEEE 1(2003): 130-134.*

Yunqiang Chen and Yong Rui *Real-Time Speaker Tracking Using Particle Filter Sensor Fusion*, Proceedings of the IEEE. vol. 92 No. 3, Mar. 2004.

N. Strobel, S. Spors, and R. Rabenstein *Joint Audio-Video Object Localization and Tracking A Presentation of General Methodology* IEEE Signal Processing Magazine Jan. 2001.

Dmitry N. Zotkin, Ramani Duraiswami and Larry S. Davis *Joint Audio-Visual Tracking Using Particle Filters* EURASIP Journal on Applied Signal Processing 2002:11, 1154-1164.

Ross Cutler, Yong Rui, Anoop Gupta, et al. *Distributed Meetings: A Meeting Capture and Broadcasting System*, (2002).

J. Vermaak, M. Gangnet, A. Blake and P. Perez *Sequential Monte Carlo Fusion of Sound and Vision for Speaker Tracking* 2001 IEEE 0-7695-1143-0/01.

M. Collobert, R. Feraud, G. Le Tourneur, O. Bernier, et al. *Listen: A System for Locating and Tracking Individual Speakers* 1996 IEEE 0-8186 7713 9/96.

David Lo, Rafik A. Goubran, Richard M. Dansereau *Mulimodal Talker Localization in Video Conferencing Environments*, (2004).

EPO Search Report for Application No. 05253372.6-2223, (2006).

J. Vermaak et al; Nonlinear Filtering for Speaker Tracking in Noisy and Reverberant Environments; Microsoft Research Cambridge, Cambridge CB2 3NH, UK; pp. 3021-3024, (2001).

Paul Viola et al; Rapid Object Detection Using a Boosted Cascade of Simple Features; IEEE; pp. I-511-I-518, (2001).

Michael Jones et al; Statistical Color Models With Application to Skin Detection; Compaq Computer Corporation; pp. 1-23, (1999).

Sharam Shahbazpanahi et al; Robust Adaptive Beamforming Using Worst-Case SINR Optimization: a New Diagonal Loading-Type Solution for General-Rank Signal Models; Department of Electrical and Computer Engineering; pp. V-323-V-336, (2003).

Changkyu Choi et al; Adaptive Cross-Channel Interference Cancellation on Blind Source Separation Outputs; Samsung Advanced Institute of Technology; pp. 1-8, (2004).

Changkyu Choi; Real-Time Binaural Blind Source Separation;4th International Symposium on Independent Component Analysis and Blind Signal Separation; Samsung Advanced Institute of Technology; Apr. 2003; ; pp. 567-572.

H. Wang, et al; Coherent Signal-Subspace Processing for the Detection and Estimation of Angles of Arrival of Multiple Wide-Band Sources; IEEE Transactions on Acoustics, Speech, and Signal Processing; vol. ASSP-33, No. 4. Aug. 1985; pp. 823-831.

Guaning Su et al.; The Signal Subspace Approach for Multiple Wide-Band Emitter Location; IEEE Transactions on Acoustics, Speech, and Signal Processing; vol. ASSP-31, No. 6, Dec. 1983; pp. 1502-1522.

Dorin Comaniciu et al.; Kernel-Based Object Tracking; IEEE Transactions on Pattern Analysis and Machine Intelligence; vol. 25, No. 5; May 2003; pp. 564-577.

Paul Viola et al; Detecting Pedestrians Using Patterns of Motion and Appearance; International Conference on Computer Vision; 2003.

Guillaume Lathoud et al; Location Based Speaker Segmentation; Dalle Molle Institute for Perceptual Artificial Intelligence (IDIAP); 2003; pp. I-176-I-179.

Gary R. Bradski; Computer Vision Face Tracking for Use in a Perceptual User Interface; Microcomputer Research Lab; Intel Corporation; pp. 1-15, (1998).

Daniel P. Huttenlocher et al.; Comparing Images Using the Hausdorff Distance Under Translation; Department of Computer Science; 1992; pp. 654-656.

Ross Cutler et al; Distributed Meetings: a Meeting Capture and Broadcasting System; Microsoft Research; 2000.

Yunqiang Chen et al.; Real-Time Speaker Tracking Using Particle Filter Sensor Fusion; Proceedings of the IEEE; vol. 92; No. 3, Mar. 2004; pp. 485-494.

Dorin Comaniciu et al; Real-Time Trackign of Non-Rigid Objects Using Mean Shift; Siemens Corporate Research & Rutgers University; 2000.

Michael Isard et al.; Contour Tracking by Stochastic Propagation of Conditional Density; In Proc. European Conf. Computer Vision; 1996; pp. 343-356.

Michael Isard et al; Incondensation: Unifying Low-Level and High-Level Tracking in a Stochastic Framework; Department of Engineering Science, (1998).

Guillaume Lathoud et al; Segmenting Multiple Concurrent Speakers Using Microphone Arrays; IDIAP Research Report; Proceedings of Eurospeech; Apr. 2003.

Michael Montemerlo; FastSLAM: A Factored Solution to the Simultaneous Localization and Mapping Problem With Unknown Data Association; Jun. 2003.

* cited by examiner

APPARATUS AND METHOD PERFORMING AUDIO-VIDEO SENSOR FUSION FOR OBJECT LOCALIZATION, TRACKING, AND SEPARATION

BACKGROUND OF THE INVENTION

1. Field of the Invention

The invention relates to a method and apparatus of target detection, and more particularly, to a method and apparatus that can detect, localize, and track multiple target objects observed by audio and video sensors where the objects can be concurrent in time, but separate in space.

2. Description of the Related Art

Generally, when attempting to detect a target, existing apparatuses and method rely either on visual or audio signals. For audio tracking, time-delay estimates (TDE) are used. However, even though there is a weighting function from a maximum likelihood approach and a phase transform to cope with ambient noises and reverberations, TDE-based techniques are vulnerable to contamination from explicit directional noises.

As for video tracking, object detection can be performed by comparing images using Hausdorff distance as described in D. P. Huttenlocher, G. A. Klanderman, and W. J. Rucklidge, "Comparing Images using the Hausdorff Distance under Translation," in *Proc. IEEE Int. Conf. CVPR,* 1992, pp. 654-656. This method is simple and robust under scaling and translations, but consumes considerable time to compare all the candidate images of various scales.

Additionally, there is a further problem in detecting and separating targets where there is overlapping speech/sounds emanating from different targets. Overlapping speech occupies a central position in segmenting audio into speaker turns as set forth in E. Shriberg, A. Stolcke, and D. Baron, "Observations on Overlap: Findings and Implications for Automatic Processing of Multi-party Conversation," in *Proc. Eurospeech,* 2001. Results on segmentation of overlapping speeches with a microphone array are reported by using binaural blind signal separation, dual-speaker hidden Markov models, and speech/silence ratio incorporating Gaussian distributions to model speaker locations with time delay estimates. Examples of these results are set forth in C. Choi, "Real-time Binaural Blind Source Separation," in *Proc. Int Symp. ICA and BSS,* pp. 567-572, 2003; G. Lathoud and I. A. McCowan, "Location based Speaker Segmentation," in *Proc. ICASSP,* 2003; G. Lathoud, I. A. McCowan, and D. C. Moore, "Segmenting Multiple Concurrent Speakers using Microphone Arrays," in *Proc. Eurospeech,* 2003. Speaker tracking using a panoramic image from a five video stream input and a microphone array is reported in R. Cutler et. al., "Distributed Meetings: A Meeting Capture and Broadcasting System," in *Proc. ACM Int. Conf. Multimedia,* 2002 and Y. Chen and Y. Rui, "Real-time Speaker Tracking using Particle Filter Sensor Fusion," *Proc. of the IEEE,* vol. 92, no. 3, pp. 485-494, 2004. These methods are the two extremes of concurrent speaker segmentation: one approach depends solely on audio information while the other approach depends mostly on video.

However, neither approach effectively uses video and audio inputs in order to separate overlapped speech. Further, the method disclosed by Y. Chen and Y. Rui uses a great deal of memory since all of the received audio data is recorded, and does not separate each speech among multiple concurrent speeches using the video and audio inputs so that a separated speech is identified as being from a particular speaker.

SUMMARY OF THE INVENTION

According to an aspect of the invention, an apparatus for tracking and identifying objects includes an audio likelihood module which determines corresponding audio likelihoods for each of a plurality of sounds received from corresponding different directions, each audio likelihood indicating a likelihood that a sound is an object to be tracked; a video likelihood module which receives a video and determines corresponding video likelihoods for each of a plurality of images disposed in corresponding different directions in the video, each video likelihood indicating a likelihood that the image is an object to be tracked; and an identification and tracking module which determines correspondences between the audio likelihoods and the video likelihoods, if a correspondence is determined to exist between one of the audio likelihoods and one of the video likelihoods, identifies and tracks a corresponding one of the objects using each determined pair of audio and video likelihoods, and if a correspondence does not exist between a corresponding one of the audio likelihoods and a corresponding one of the video likelihoods, identifies a source of the sound or image as not being an object to be tracked.

According to an aspect of the invention, when the identification and tracking module determines a correspondence between multiple pairs of audio and video likelihoods, the identification and tracking module identifies and individually tracks objects corresponding to each of the pairs.

According to an aspect of the invention, the identification and tracking module identifies and tracks a location of each determined pair.

According to an aspect of the invention, for each image in the received video, the video likelihood module compares the image against a pre-selected image profile in order to determine the video likelihood for the image.

According to an aspect of the invention, the pre-selected image profile comprises a color of an object to be tracked, and the video likelihood module compares a color of portions of the image in order to identify features indicative of an object to be tracked.

According to an aspect of the invention, the pre-selected image profile comprises a shape of an object to be tracked, and the video likelihood module detects an edge of each image and compares the edge of each image against the shape to identify features indicative of an object to be tracked.

According to an aspect of the invention, the pre-selected image profile further comprises poses for the object to be tracked, and the video likelihood module further compares each edge against each of the poses to identify features indicative of an object to be tracked.

According to an aspect of the invention, the video likelihood module normalizes each edge in order to be closer to a size of the poses and the shape in order to identify features indicative of the object to be tracked.

According to an aspect of the invention, the video likelihood identifies an edge of each image as not being an object to be tracked if the edge does not correspond to the shape and the poses.

According to an aspect of the invention, the video likelihood identifies an edge as not being an object to be tracked if the edge does not include the color.

According to an aspect of the invention, a first one of the objects is disposed in a first direction, a second one of the objects is disposed in a second direction, and based on the correspondences between the audio and video likelihoods, the identification and tracking module identifies the first object as being in the first direction and the second object as being in the second direction.

According to an aspect of the invention, the identification and tracking module tracks the first object as the first object moves relative to the second object.

According to an aspect of the invention, the video likelihood module receives the images detected using a camera and the identification and tracking module tracks and identifies the first object as the first object moves relative to the second object such that the first object crosses the second object from a perspective of the camera.

According to an aspect of the invention, further comprising a beam-former which, for each identified object, from the received sounds audio corresponding to a location of each identified object so as to output audio channels corresponding uniquely to each of the identified objects.

According to an aspect of the invention, the apparatus receives the sounds using a microphone array outputting a first number of received audio channels, each received audio channel includes an element of the sounds, the beam-former outputs a second number of the audio channels other than the first number, and the second number corresponds to the number of identified objects.

According to an aspect of the invention, further comprising a recording apparatus which records each audio channel for each identified object as separate audio tracks associated with each object.

According to an aspect of the invention, each output channel includes audible periods in which speech is detected and silent periods between corresponding audible periods in which speech is not detected, and the apparatus further comprises a speech interval detector which detects, for each output channel, a start and stop time for each audible period.

According to an aspect of the invention, the speech interval detector further detects a proximity between adjacent audible periods, if the proximity is less than a predetermined amount, determines that the adjacent audible periods are one continuous audible period and connects the adjacent audible periods to form the continuous audible period, and if the proximity is more than the predetermined amount, determines that the adjacent audible periods are separated by the silent period and does not connect the adjacent audible periods.

According to an aspect of the invention, the speech interval detector further detects a length of each audible period, if the length is less than a predetermined amount, determines that the audible period is a silent period and erases the audible period, and if the length is more than the predetermined amount, determines that the audible period is not a silent period and does not erase the audible period.

According to an aspect of the invention, the speech interval detector further for each audible period, outputs the detected speech, and for each silent period, deletes the sound from the audio channel.

According to an aspect of the invention, further comprising a post processor which, for each of plural audio channels received from the beam-former, detects audio portions related to cross channel interference caused by the remaining audio channels and removes the cross channel interference.

According to an aspect of the invention, further comprising a controller which controls a robotic element according to the identified object.

According to an aspect of the invention, the robotic element comprises at least one motor used to move the apparatus according to the identified object.

According to an aspect of the invention, the robotic element comprises at least one motor used to remotely move an element connected to the apparatus through an interface according to the identified object.

According to an aspect of the invention, further comprising an omnidirectional camera which outputs a 360° panoramic view image to the video likelihood module.

According to an aspect of the invention, further comprising at least one limited field of view camera which outputs an image to the video likelihood module which has a field of view that is less than 360°.

According to an aspect of the invention, the audio likelihood module further detects, for each received sound, an audio direction from which a corresponding sound is received, the video likelihood module further detects, for each image, a video direction from which the image is observed, and the identification and tracking module further determines the correspondences based upon a correspondence between the audio directions and the video directions.

According to an aspect of the invention, the video received by the video likelihood module is an infrared video received from a pyrosensor.

According to an aspect of the invention, a method of tracking and identifying objects using at least one computer receiving audio and video data includes, for each of a plurality of sounds received from corresponding different directions, determining in the at least one computer corresponding audio likelihoods, each audio likelihood indicating a likelihood the sound is an object to be tracked; for each of a plurality of images disposed in corresponding different directions in a video, determining in the at least one computer video likelihoods, each video likelihood indicating a likelihood that the image in the video is an object to be tracked; if a correspondence is determined to exist between one of the audio likelihoods and one of the video likelihoods, identifying and tracking in the at least one computer a corresponding one of the objects using each determined pair of audio and video likelihoods, and if a correspondence does not exist between a corresponding one of the audio likelihoods and a corresponding one of the video likelihoods, identifying in the at least one computer a source of the sound or image as not being an object to tracked.

According to an aspect of the invention, a computer readable medium is encoded with processing instructions for performing the method using the at least one computer.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
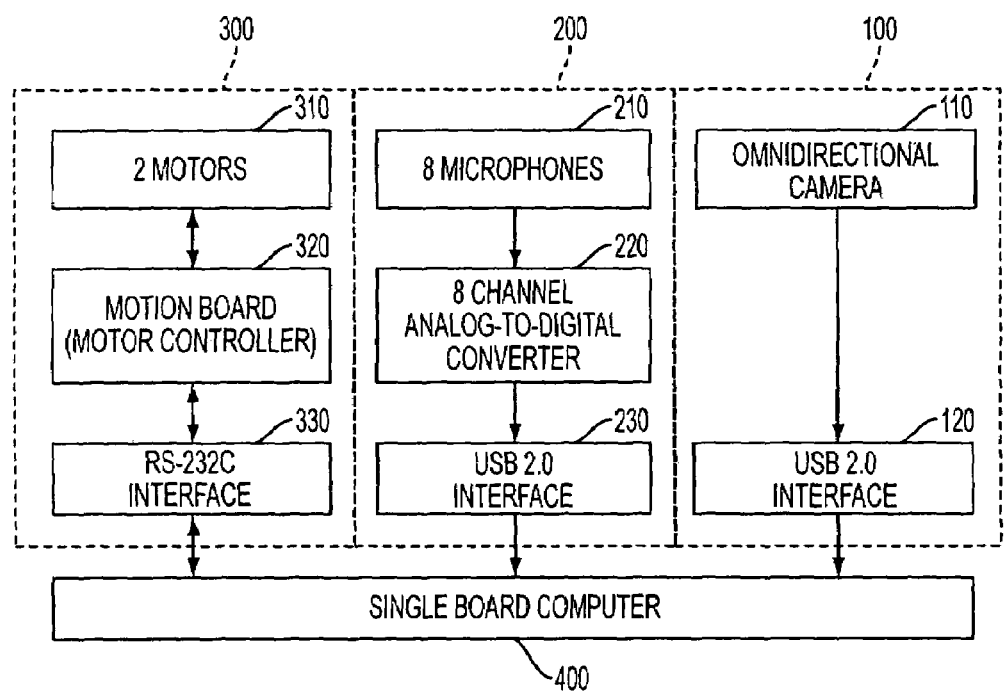
FIG. 1 shows an apparatus which synthesizes visual and audio information in order to track objects according to an aspect of the invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 shows a robot having the audio and video of localization and tracking ability according to an aspect of the invention. As shown in FIG. 1, the apparatus includes a visual system 100, an audio system 200, and a computer 400. While not required in all aspects of the invention, the apparatus further includes a robotic element 300 which is controlled by the computer 400 according to the input from the visual and audio systems 100 and 200. It is understood that the robotic element 300 is not required in all aspects of the invention, and that the video and audio systems 100, 200 need not be integrated with the computer 300 and can be separately disposed.

According to an aspect of the invention, the apparatus according to an aspect of the invention is a robot and can move through an unknown environment or be stationary. The robot can execute controls and collect observations of features in the environment. Based on the control and observation sequences, the robot according to an aspect of the invention detects, localizes, and tracks at least one target, and is capable of tracking and responding to multiple target objects. According to a further aspect of the invention, the robot is capable of separating each modality of each of the targets among multiple objects, such as modalities based on the speech and face of each of the target speakers. According to another aspect of the invention, the objects and the robot are assumed to be in the x-y plane for the purposes of the shown embodiment. However, it is understood that the method can easily be extended to three-dimensional space according to aspects of the invention.

While shown as used in a robot, it is understood that the apparatus and method can be applied in other situations where tracking is used to prevent collisions or to perform navigation, such as in aircraft, automobiles, and ship, or in stand alone applications to track and segregate multiple objects having visual and audio signatures from a stationary or moving location of the apparatus.

Figure 3A:
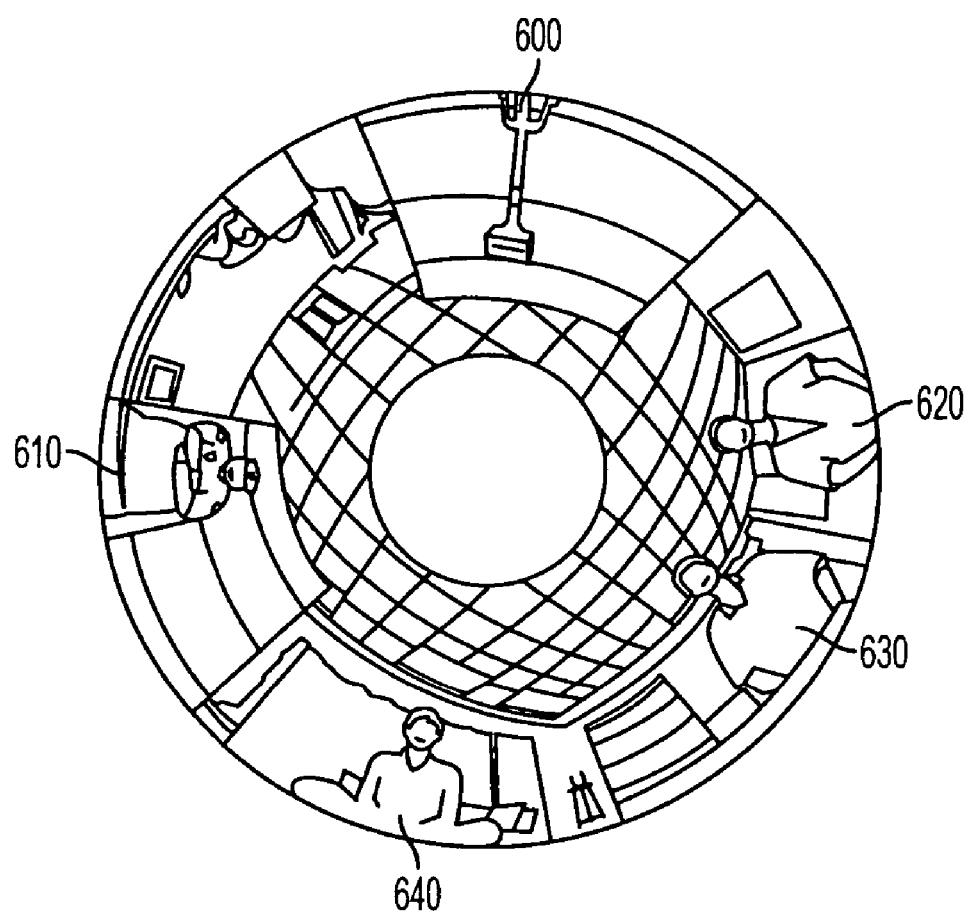
FIG. 3A is an example of a video including images of potential targets received by the apparatus of FIG. 1 and tracked according to an aspect of the invention.

The visual system includes an omnidirectional camera 110. The output of the omnidirectional camera 110 passes through a USB 2.0 interface 120 to the computer 400. As shown, the omnidirectional camera 110 provides a 360° view providing the output shown in FIG. 3A. However, it is understood that the camera 110 could have a more restricted field of view, such that might occur with a teleconferencing type video camera which has a field of view of less than 180°. Also, it is understood that multiple limited field of view and/or omnidirectional cameras can be used to increase the view both in a single plane as shown in FIG. 3A and in additional planes. Moreover, it is understood that other types of interfaces can be used instead of or in addition to the USB 2.0 interface 120, and that the connection to the computer 400 can be wired and/or wireless connections according to aspects of the invention.

The audio system 200 includes a microphone array having eight (8) microphones 210. The eight microphones are set up at 45° intervals around a central location including the camera 110 center so as to be evenly spaced as a function of angle relative to a center point of the apparatus including a center point of the camera1 110. However, it is understood that other configurations are possible, such as where the microphones are not connected at the central location and are instead on walls of a room in predetermined locations. While not required in all aspects of the invention, it is understood that other numbers of microphones 210 can be used according to an aspect of the invention, and that the microphones 210 can be disposed at other angles according to aspects of the invention.

Each microphone 210 outputs to a respective channel. As such, the microphone array shown in FIG. 1 outputs eight channels of analog audio data. An analog to digital converter 220 receives and digitized the analog audio data in order to provide eight channels of digitized audio data. The digitized eight channels audio data are output from the converter 220 and received by the computer 400 through a USB interface 230. It is understood that other types of interfaces can be used instead of or in addition to the USB interface 230, and that the connection can be wired and/or wireless connections according to aspects of the invention. Additionally, it is understood that one or more of the microphones 210 can directly output a corresponding digital audio channel (such as exists in digital microphones) such that the separate analog-to-digital converter 220 need not be used for any or all of the channels in all aspects of the invention.

The computer 400 performs the method shown in FIG. 2 according to an aspect of the invention as will be described below. According to an aspect of the invention, the computer 400 is a Pentium IV 2.5 GHz single board computer. However, it is understood that other types of general or special purpose computers can be used, and that the method can be implemented using plural computers and processors according to aspects of the invention.

In the shown embodiment of FIG. 1, the apparatus is used with a robot which is able to move in reaction to detected targets. As such, the output of the computer 400 is fed to the robotic element 300 through an RS 232C interface 330 to a motor controller 320. The motor controller 320 controls two motors 310 according to the instructions of the computer 400 to move the robot. In this way, the computer 400 can control the robot to follow a particular target according to a recognized voice and as distinguished from other targets according to the audio and video data processed by the computer 400. However, it is understood that other numbers of motors can be used according to the functionality of the robot. Examples of such robots include, but are not limited to, household robots or appliances having robotic functionality, industrial robots, as well as toys.

It is further understood that the motors 310 need not be included on an integrated robot, but instead can be used such as for controlling external cameras (not shown) to separately focus on different speakers in the context of a televised meeting, singers in a recorded music concert, speakers in a teleconferencing application, or to focus on and track movement of detected objects in the context of a home or business security system in order to detect intruders or persons moving around in a store.

Figure 2:
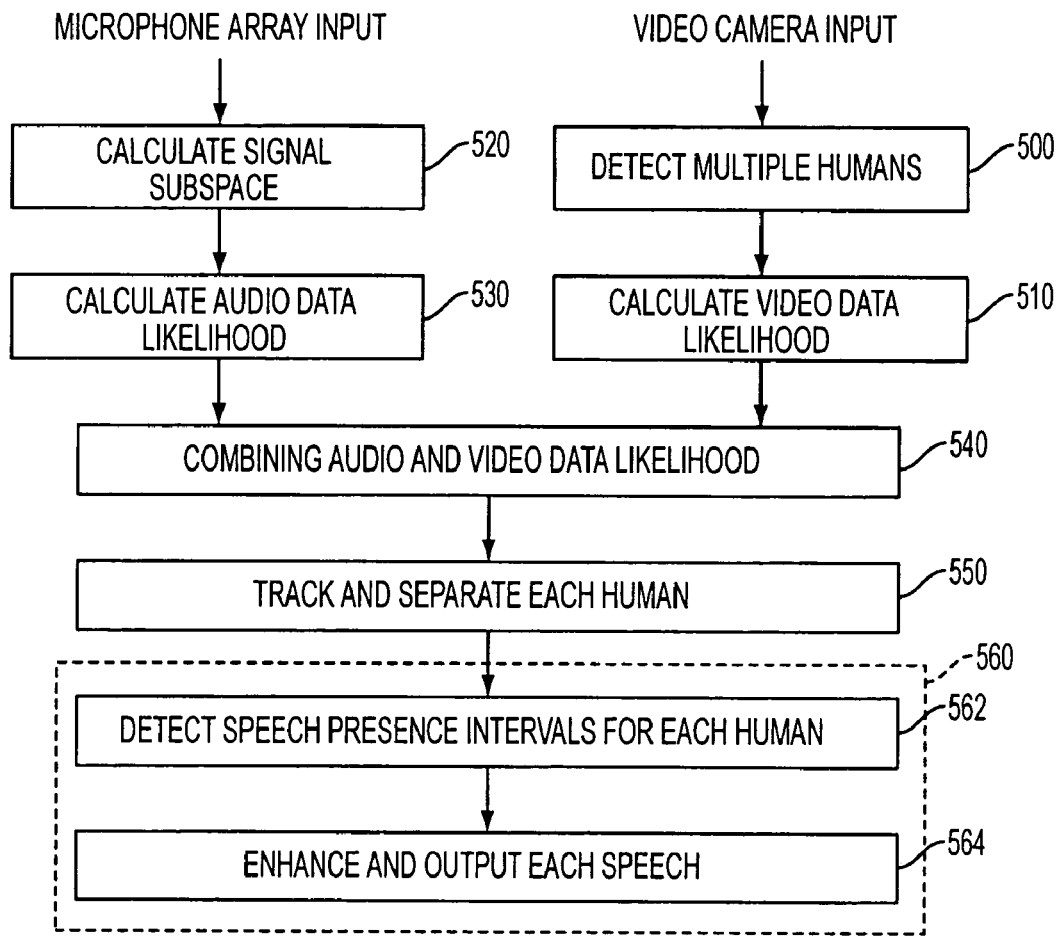
FIG. 2 shows a flowchart of a method of synthesizing visual and audio information in order to track multiple objects according to an aspect of the invention.

FIG. 2 shows the method performed by the computer 400 according to an aspect of the invention. Video camera 110 input is received from the visual system 100, and the computer 400 visually detects multiple humans in operation 500 using equation 26 as explained in greater detail below. From this received image, the computer 400 calculates the likelihood that each potential target 600 through 640 is a human being in operation 510 using equation 27 as set forth in greater detail below.

By way of an example and as shown in the example in FIG. 3A, the received video image has multiple potential targets 600 through 640 to be tracked. In the shown example, the targets are pre-selected to be human. A first target 600 is an audio speaker, which provides audio noise but does not provide a video input image which is identifiable as a human being. Targets 620, 630, and 640 are all potential human beings each of which may need to be tracked by the computer 400. A target 610 is a picture provides visual noise in the form of a possible human target, but which does not provide audio noise as would be understood by the computer 400.

Figure 3B:
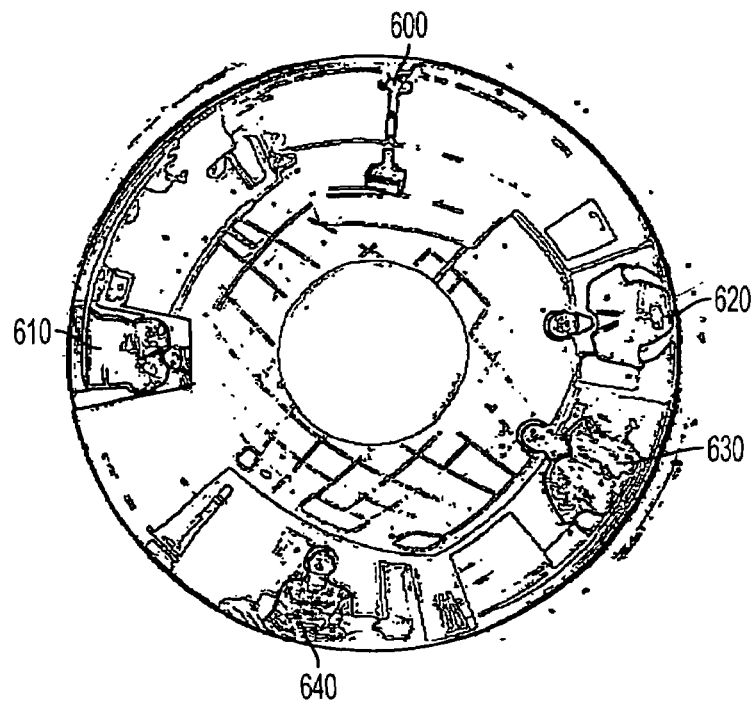
FIG. 3B is a sub-image showing edge images extracted from FIG. 3A and tracked according to an aspect of the invention.
Figure 3C:
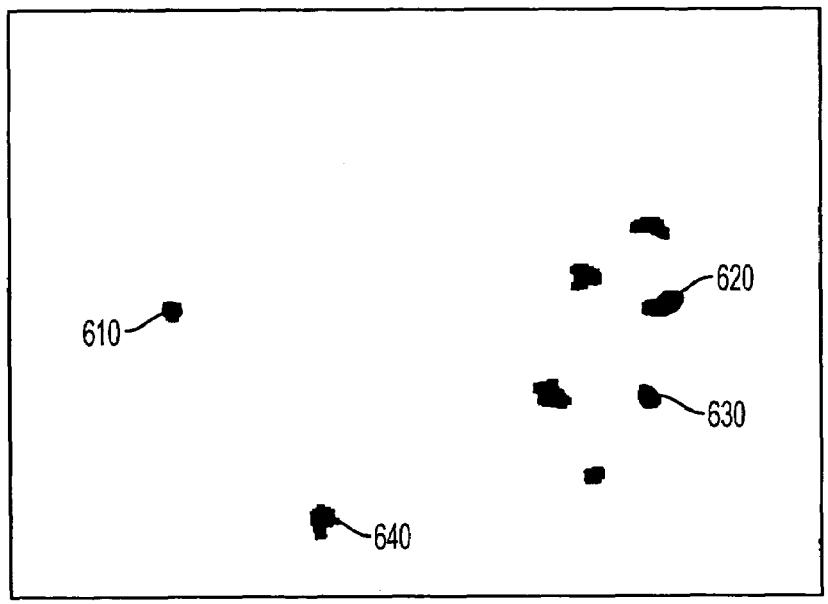
FIG. 3C is a sub-image showing image portions having a predetermined color extracted from FIG. 3A and tracked according to an aspect of the invention.

The image in FIG. 3A is broken down into two sub images shown in FIGS. 3B and 3C. In FIG. 3B, an edge image is detected from the photograph in FIG. 3A. In the shown example, the edge image is based upon a predetermined form of an upper body of a torso of a human being as well as a predetermined number of poses as will be explained below in greater detail. As shown in FIG. 3B, the upper body of the human being is shown as an edge image for the picture 610 and for targets 620 through 640, but is not distinctly shown for the edge image of target 600. As such, the computer 400 is more likely to detect the edge images for the picture 610 and for the target 620 through 640 as being human beings as shown by the video likelihood graph shown in FIG. 4B.

In order to further refine and track human beings, a second sub image is used according to an aspect of the invention. Specifically, the computer 400 will detect a color (i.e., flesh tones) in order to distinguish human beings from non human beings. As shown in FIG. 3C, the computer 400 recognizes the face and hands based on the flesh tones such as those in targets 620 and 630, in order to increase the likelihood that the targets 620 through 640 will be identified as a human being. The flesh tones result in blobs for the picture 610, which increases the likelihood that the picture 610 will also be identified by the computer 400 as a human being. However, since the audio speaker 600 is not shown in FIG. 3C, the audio speaker 600 does not register as a human being since the audio speaker 600 lacks a flesh tone for use in FIG. 3C and has a non-compliant edge image in FIG. 3B.

Additionally, while not required in all aspects, the recognized features in the second sub image is used to normalize the edge image in the first sub image so that the detected edge images more closely match a pre-selected edge image. By way of example, a position of the blobs shown in FIG. 3C is used to match against the human torso and pose images stored in the computer 400 in order for the positions of the hands and faces in the edge image shown in FIG. 3B to more closely matches the size of the pre-selected edge images, thus improving the detection results using both the first and second sub-images shown in FIGS. 3B and 3C.

Accordingly in operation 510, the computer 400 will calculate a video likelihood based on the edge image shown in FIG. 3B and the blob image shown in FIG. 3C, resulting in a combined video likelihood image shown in FIG. 4B as a function of relative degree as discussed in greater detail below. Specifically as shown in FIG. 4B, the computer 400 identified the targets 620, 630, 640 and the picture 610 are all identified as being possible human beings to be tracked, but has not identified the audio speaker 600 as being a likely human/target to be tracked.

In order to determine the audio likelihood using the method of FIG. 2, the microphone array input received by the computer 400 from the audio system 200 tracks noise as a function of receiving angle using a beam-forming technique in order to determine a location of noise as discussed in greater detail below. The audio data that is received is calculated with a signal sub space and operation 520 using equation 19, and a likelihood that the audio data is a human being is determined in operation 530 using equation 25 as set forth below in greater detail.

Figure 4A:
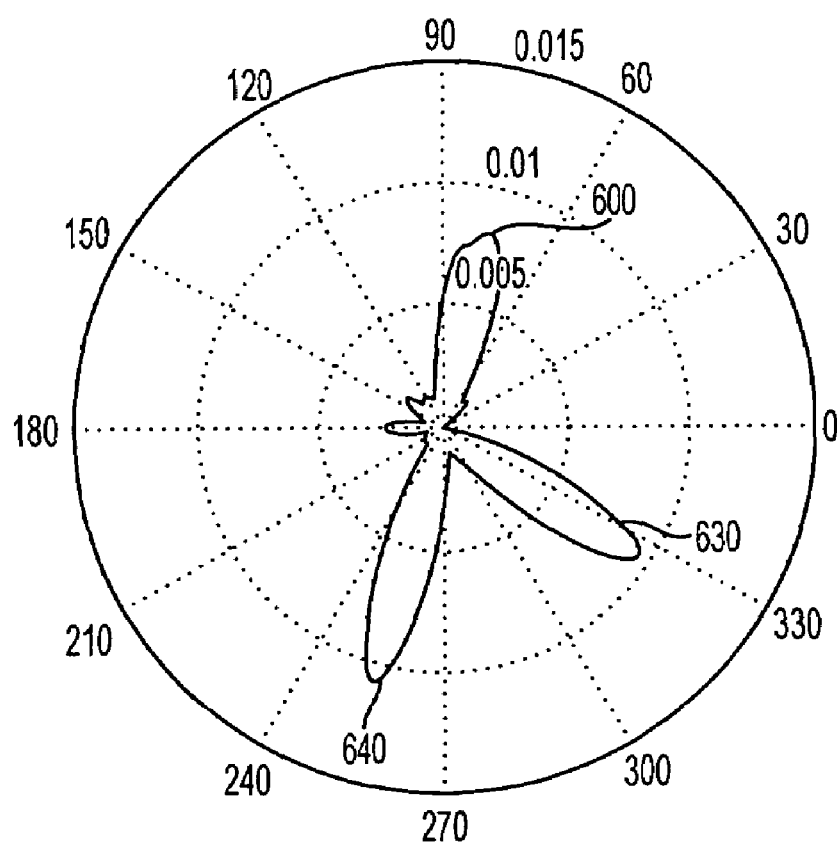
FIG. 4A shows an audio likelihood of objects as being objects to be tracked as well as a location of the audio source tracked at a specific time according to an aspect of the invention.
Figure 4B:
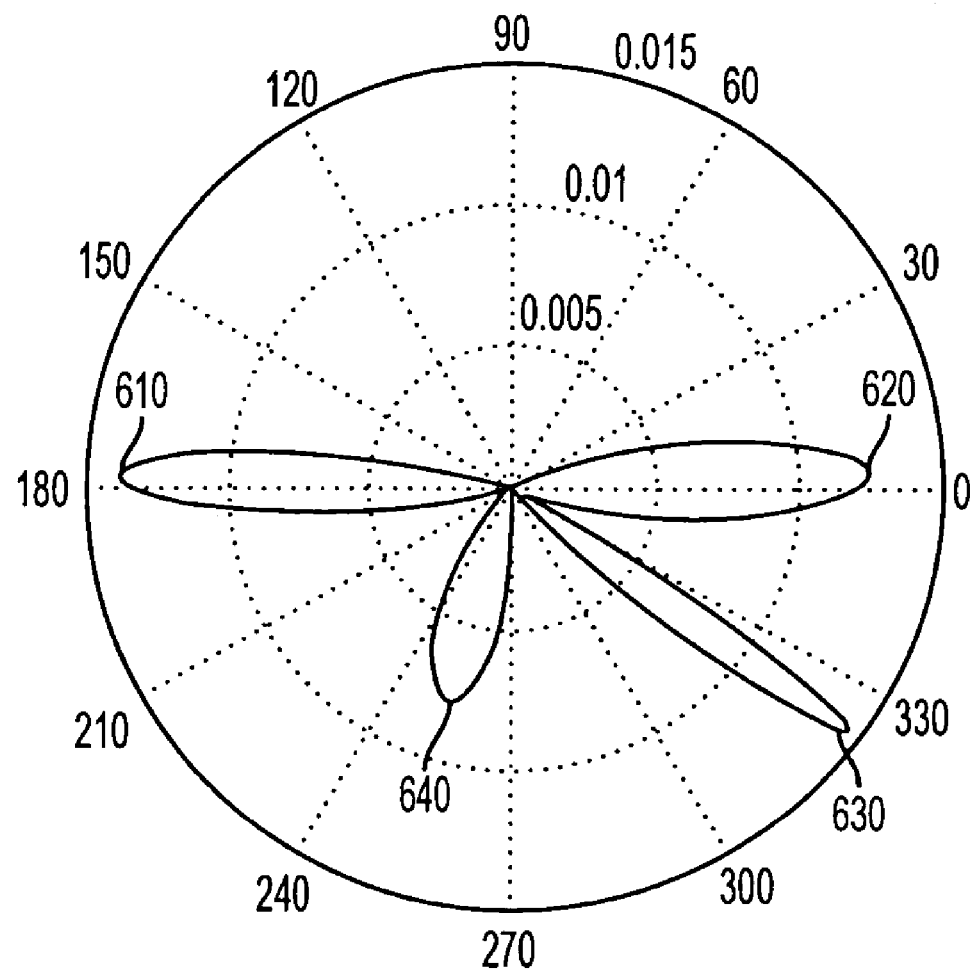
FIG. 4B shows a video likelihood of objects as being objects to be tracked as well as a location of the object tracked at the specific time according to an aspect of the invention.

As shown in FIG. 4A, by way of example, the computer 400 recognizes the audio speaker 600 as providing noise, as well as target 630 and 640 as providing noise. As such, the computer 400 recognizes that the audio speaker 600 and the target 630 and 640 are potential human beings (i.e., targets) to be tracked.

In operation 540, the computer 400 combines the video and audio likelihood in order to determine which audio target detected in operation 530 and video target detected in operation 510 is most likely a human to be tracked using equation 30 described below. Since the video and audio likelihood also contain directional information, each target is recognized as a function of position.

Figure 4C:
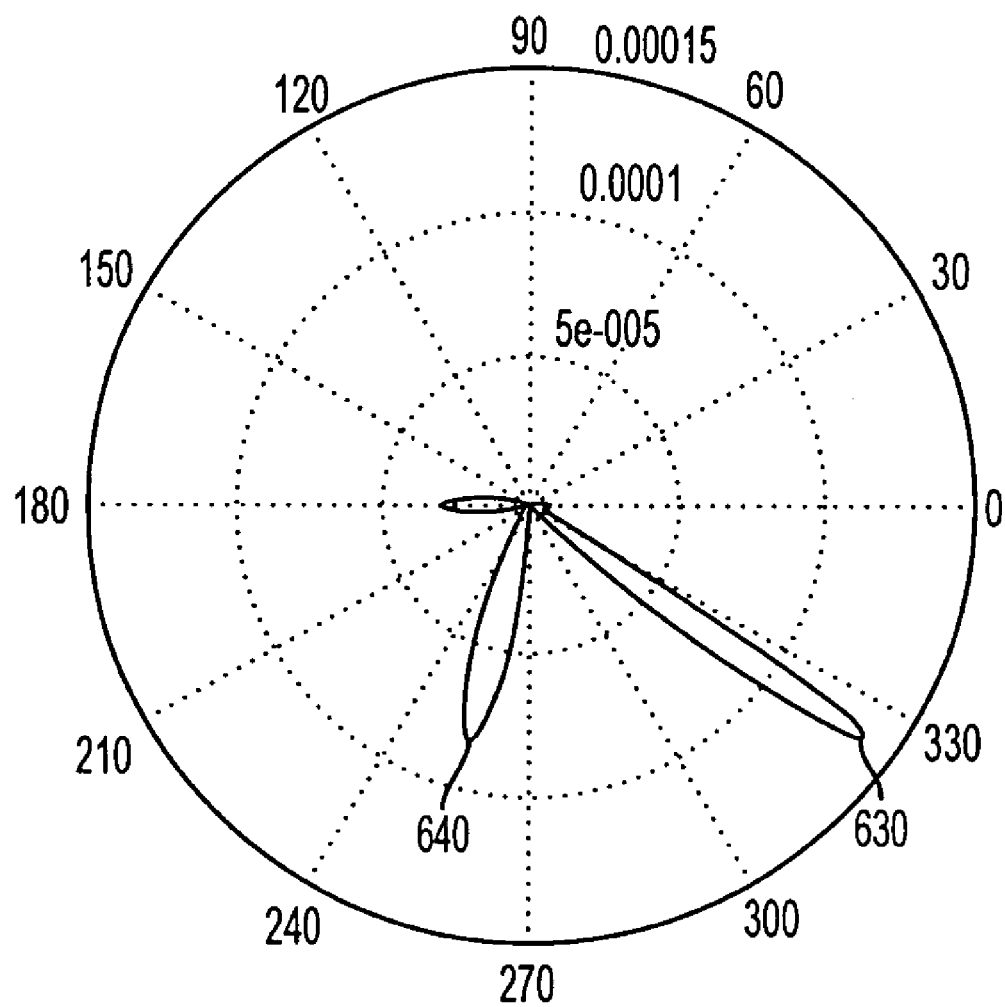
FIG. 4C shows a combined likelihood from the audio and video likelihoods of FIGS. 4A and 4B and which identifies each object as objects to be tracked at the specific time according to an aspect of the invention.

As shown in the example in FIG. 4C, the computer 400 is able to distinguish that the target 630 and 640 are human beings who are presently talking by performing operation 530. Each target 630 and 640 is identified by position, which is shown as being an angular position but can be otherwise identified according to other aspects of the invention. The audio speaker 600 is not shown since the audio speaker 600 does not have a strong video likelihood of being a human being as detected in operations 500 and 510. Alternately, the target 620, who is not speaking, and the picture 610, which cannot speak, were not determined to have a strong likelihood of being a person to be tracked by the computer 400.

Once the audio and video data likelihood are combined in operation 540, the computer 400 is able to track each human being separately in operation 550 using equations (30) and (36-38) as set forth below in greater detail. In this way, each person is individually identified by position and a channel of audio data is identified with a particular image. Thus, if the target 620 begins speaking, a separate track is output and remains associated with this target 620.

Figure 5A:
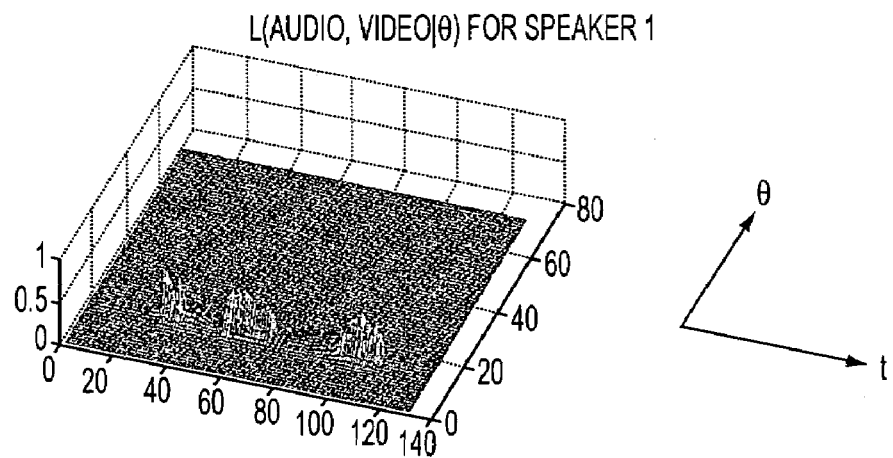
FIG. 5A shows the audio likelihood for speaker 1 separated from the total audio field shown in FIG. 5D based on the identified location of speaker 1 based on the combined audio and video likelihoods according to an aspect of the invention.
Figure 5B:
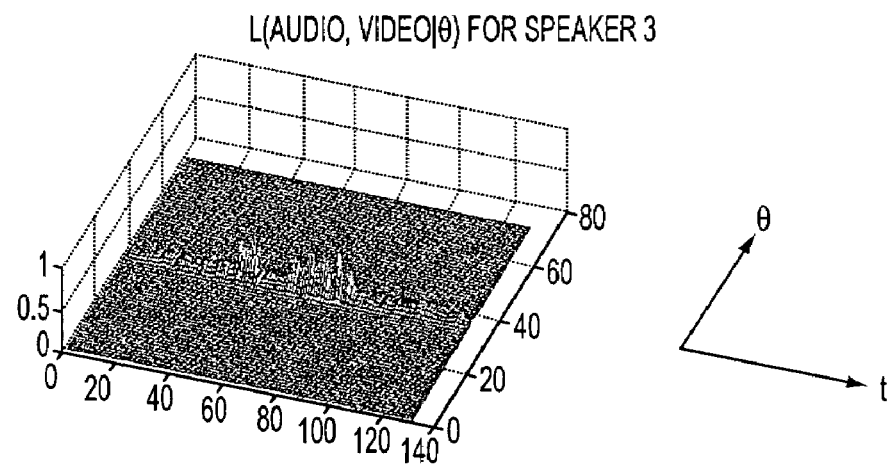
FIG. 5B shows the audio likelihood for speaker 2 separated from the total audio field shown in FIG. 5D based on the identified location of speaker 2 based on the combined audio and video likelihoods according to an aspect of the invention.
Figure 5C:
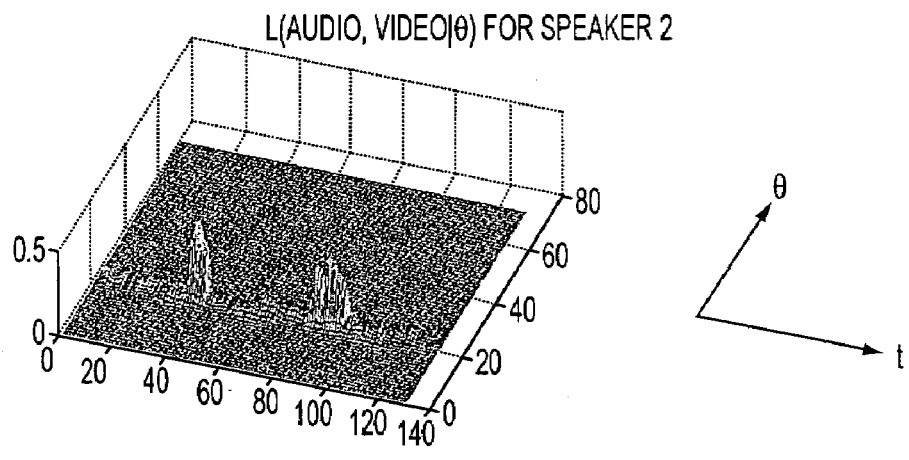
FIG. 5C shows the audio likelihood for speaker 3 separated from the total audio field shown in FIG. 5D based on the identified location of speaker 3 based on the combined audio and video likelihoods according to an aspect of the invention.
Figure 5D:
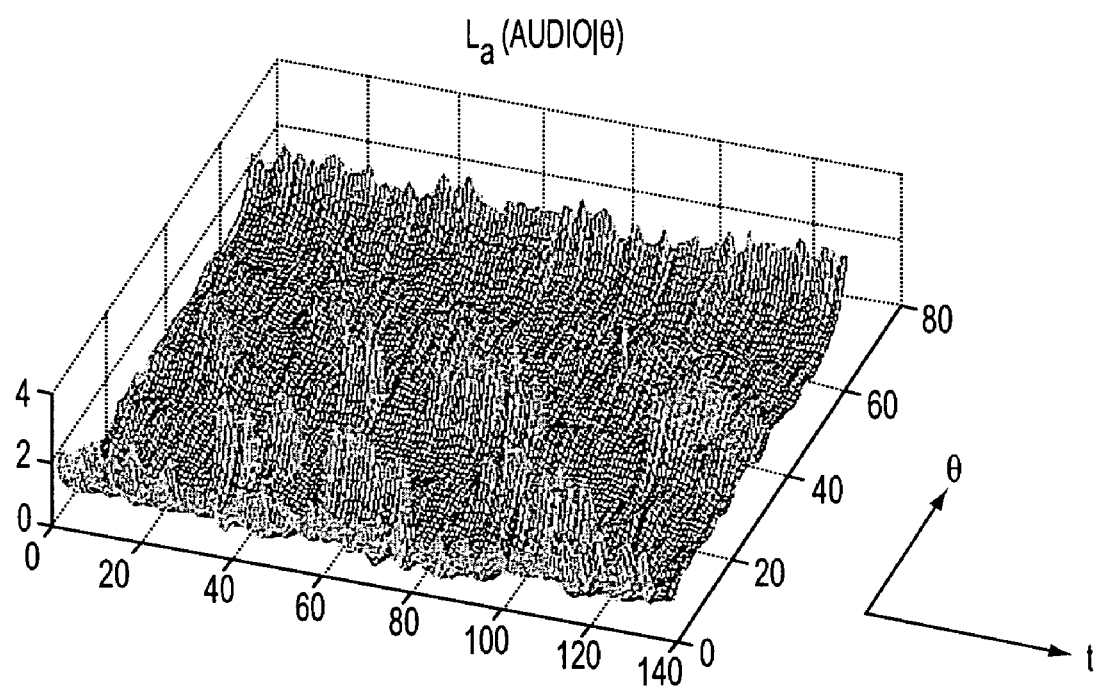
FIG. 5D shows the audio field as a function of location and time based upon the audio likelihoods according to an aspect of the invention.

By way of example, when speakers 1 through 3 are all speaking as shown in FIG. 5D, the computer 400 is able to recognize the location of each of the speakers 1 through 3 as a function of angular position. Based upon this known angular position, the computer 400 segregates the audio at the angular position of each speaker 1 through 3 such that a first audio track is detected for speaker 1 as shown in FIG. 5A, a second audio track is detected for speaker 2, and a third audio track is detected for speaker 3 as shown in FIG. 5C. In this way, the remaining audio data need not be recorded or transmitted, thus saving on bandwidth and storage space according to an aspect of the invention. Thus, since each track is identified with a visual target, the computer 400 is able to keep the separate speeches according to the person talking.

Additionally, the computer 400 is able to keep the separate tracks even where each speaker 1 through 3 moves according to an aspect of the invention. By way of example, by recognizing the modalities of the audio and video likelihoods, such as using color histograms to color code individuals, the computer 400 can track each speaker 1 through 3, even where the individuals move and cross in front of each other while maintaining a separate audio track in the same, separately assigned channel. According to an aspect of the invention, the computer 400 used equations (30) and (A) to provide FIG. 4C and FIGS. 5A through 5C. However, it is understood that other algorithms and equations can be used or adapted for use in other aspects of the present invention, and that the equations can be simplified if it is assumed the targets are stationary and not requiring accurate tracking. Equation (A) is as below and is understood by reference to equation (27) below.

$$p(z_v^i(t)) = \alpha_i N(\theta_i, \sigma_i^2). \quad (A)$$

By way of example, FIGS. 5A through 5C shows an example in which the computer 400 separated the speech from each targets 620 through 640 as three separate tracks according to an aspect of the invention. Specifically, the audio field based on only the audio Likelihood $L_a(audio|\theta)$ and the position of the sound sources is shown in FIG. 5D. In this audio field, each speaker is located at a different angular location $\theta$ and the speakers are having a conversation with each other that is being recorded using the apparatus shown in FIG. 1. Additional background noise exists at different locations $\theta$. By combining the audio and video data likelihood $L(audio, video|\theta)$, the computer 400 is able to segregate the speeches individually based on the relative angular position of each detected speaker 1 through 3. Thus, the computer 400 is able to output the separate tracks as shown in FIGS. 5A through 5C using, by way of example, beam-forming techniques. Thus, it is possible to record only the speech of each of the three speakers 1 through 3 without the speeches of the remaining non-tracked speakers or the background noise, thus considerably saving on memory space and transmission bandwidth while also allowing post-processing to selectively enhance each speaker's recorded voice according to an aspect of the invention. Such separation could be useful in multiple contexts, such as meetings, dramatic performances, as well as in recording musical performances in order to later amplify selected tracks of speakers, singers, and/or musical instruments.

While not required in all aspects of the invention, where the audio itself is being tracked in order to record or transmit the audio from different people, an optional signal conditioning operation is performed in operation 560. In the shown example, the computer 400 will detect speech presence intervals (SPI) for each speech track in operation 562 in order to smooth out the speech pattern for the speakers as explained below in relation to equations (40) through (48). In operation 564, each targeted speech from each target in enhanced using an adaptive cross cancellation technique as will be explained in detail below in relation to equations (49) through (64). While described in terms of being performed by computer 400 for the purpose of simplicity, it is understood that other computers or processors can be used to perform the processing for the signal conditioning once the individual target speakers are identified.

In regards to operation 560, such signal conditioning might be used in the context of dictation for recording minutes of meetings, recording music or dramatic performances, and/or for recording and/or transmission of meetings or television shows in which audio quality should be enhanced. However, it is understood that the operations 562 and 564 can be performed independently of each other or need not be provided at all in context of a robot that does not require an enhanced speech presence or where it is not critical to enhance the speech pattern of a target person.

In regards to operation 562, a person's speech pattern might have certain dips which might be detected as a stoppage of speech and therefore create an unpleasant discontinuity in a recorded or transmitted sound. Alternately, a sudden spike in speech such as due to a cough, are often not desirable as relevant to that person's speech. By way of example, in FIG. 6C, the speaker has a pause in speech at close to time 80. Such a pause is not shown in the speakers' patterns shown in FIGS. 6A and 6B. As shown in FIG. 7C, this pause will result in a discontinuity for the audio which needs to be removed in order to improve audio quality. However, it is also desirable to record the stop and start times for the audio in order not to record background noises not relevant to a conversation. By performing speech processing in operation 562, the computer 400 is able to preserve audio around time 80 as shown in FIG. 8C as opposed to an ending of a speech from a particular person while establishing speech envelopes such that true pauses in speech are not recorded or transmitted. A process for this type of signal conditioning will be explained below in relation to equations (40) through (48). However, where pauses or sudden spikes in speech are not important, equation (48) as expressed in operation 562 can be omitted.

Figure 9:
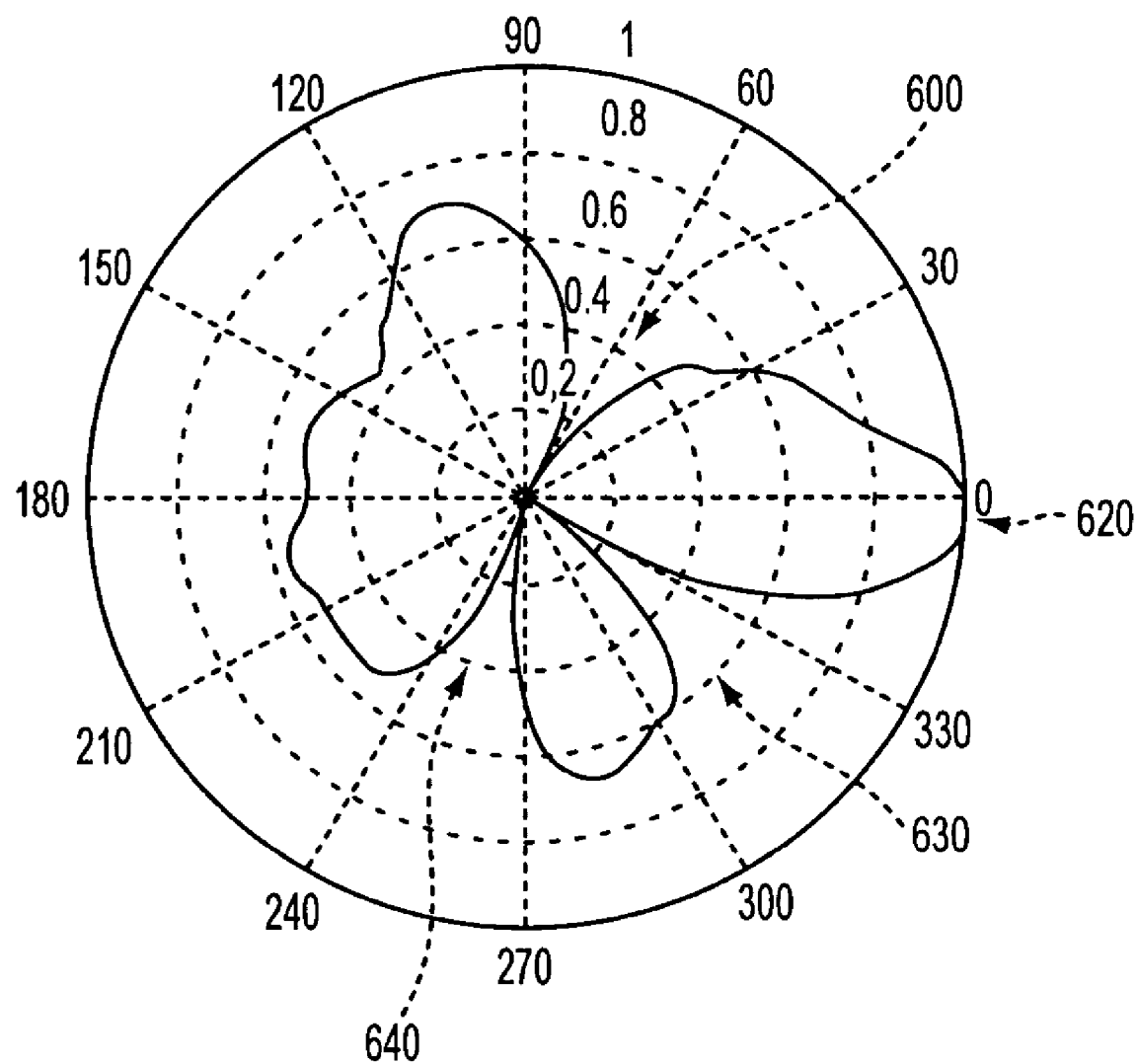
FIG. 9 shows the use of beam-forming to remove noises from non-selected targets in order to localize and concentrate on a selected target according to an aspect of the invention.

While not required in all aspects, the computer 400 is able to use the detected locations of speakers to isolate a particular and desired target to have further enhanced speech while muting other known sources designated as being non desired targets. By way of the example shown in FIG. 9, since the audio speaker 600 is identified as not being a person, the computer 400 eliminates noise from that source by reducing the gain for that particular direction according to an aspect of the invention. Alternately, where the speech of targets 630 and 640 is to be eliminated or muted, the computer 400 reduces the gain in the direction of targets 630 and 640 such that the noises from targets 630 and 640 are effectively removed. Further, in order to emphasize the speech or noise from target 620, the gain is increased in the direction of target 620 according to an aspect of the invention. As such, through selective gain manipulation, speech of individual targets can be enhanced according to the needs of a user.

While not required in all aspects, the computer 400 uses a beam-forming technique in manipulating the gain of the targets 620, 630, 640 and the audio speaker 600 since the locations of each are known. Further explanation of beam-forming is provided below, and examples of beam-forming techniques are also set forth S. Shahbazpanahi, A. B. Gershman, Z.-Q. Luo, and K. Wong, "Robust Adaptive Beamforming using Worst-case SINR Optimization: A new Diagonal Loading-type Solution for General-rank Signal," in *Proc. ICASSP,* 2003; and H. L. V. Trees, *Optimum Array Processing,* Wiley, 2002, the disclosures of which are incorporated by reference. However, it is understood that this type of audio localization is not required in all aspects of the invention.

Figure 10:
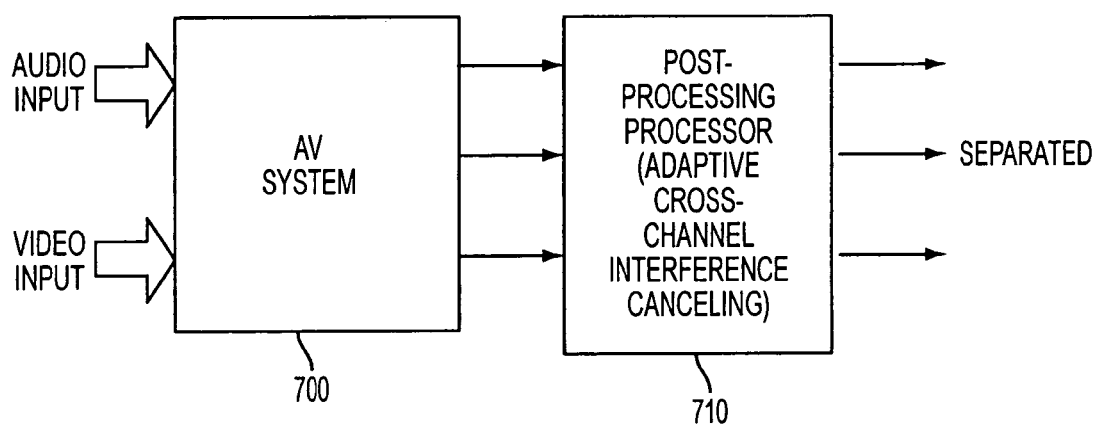
FIG. 10 is a block diagram showing a post processor performing adaptive cross-channel interference canceling on the output of the apparatus of FIG. 1 according to an aspect of the invention.

FIG. 10 shows a post processing apparatus which is connected to or integral with the apparatus shown in FIG. 1, and is used to smooth out the output audio data in order for enhanced audio quality. Specifically, the audio/visual system 700 receives the audio and video channels to be processed. While not required in all aspects, the audio/visual system 700 comprises visual system 100, the audio system 200, and the computer 400 of FIG. 1.

Figure 11A:
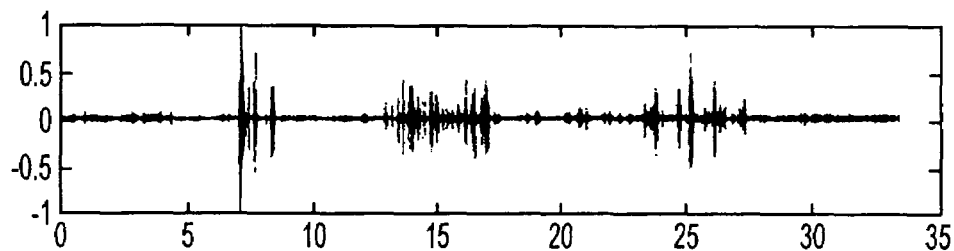
FIGS. 11A-11C show corresponding channels of audio data output from the AV system in FIG. 10 and each include interferences from adjacent channels according to an aspect of the invention.
Figure 11B:
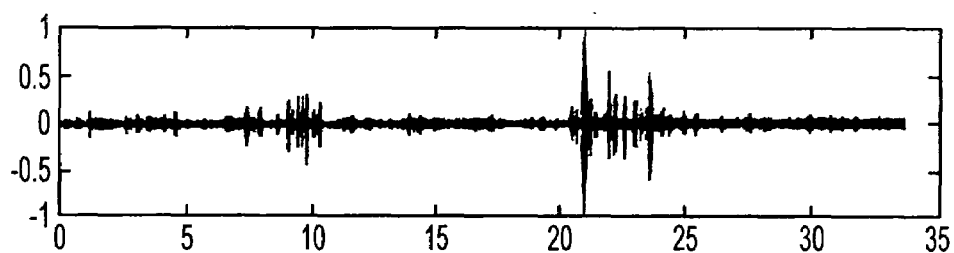
Figure 11C:
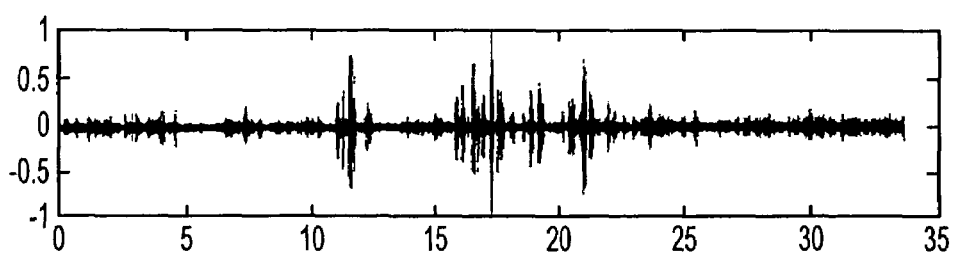

The audio/visual system 700 outputs separated tracks of audio data, where each track corresponds to each from speaker. Examples of the output are shown in FIGS. 11A through 11C. A post processor 710 performs adaptive cross channel interference canceling according to an aspect of the invention in order to remove the audio noise included in each track and which is caused by the remaining tracks. The processor 710 processes these signals in order to output corresponding processed signals for each channel which has removed the interference of other channels as will be explained below in relation to equations (49) to (64) and is discussed more fully in C. Choi, G.-J. Jang, Y. Lee, and S. Kim, "Adaptive Cross-channel Interference Cancellation on Blind Signal Separation Outputs," in *Proc. Int. Symp. ICA and BSS,* 2004, the disclosure of which is incorporated by reference.

As shown in FIGS. 11A-11C, there are three channels output by the system 700. The speech of speaker 1 is in FIG. 11A, the speech of speaker 2 is in FIG. 11B, and the speech of speaker 3 is in FIG. 11C. As can be seen, each track includes interference from adjacent track.

Figure 12A:
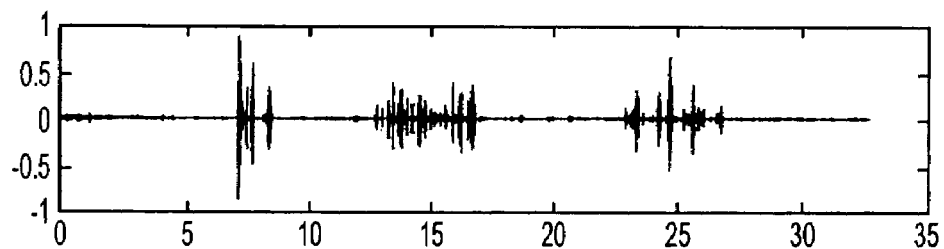
FIGS. 12A-12C show the post processed audio data in which the interference has been removed for each channel according to an aspect of the invention.
Figure 12B:
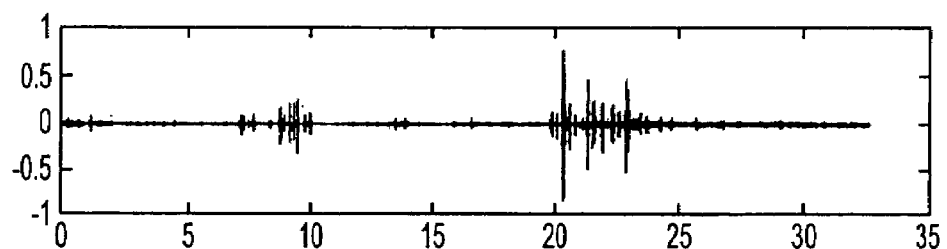
Figure 12C:
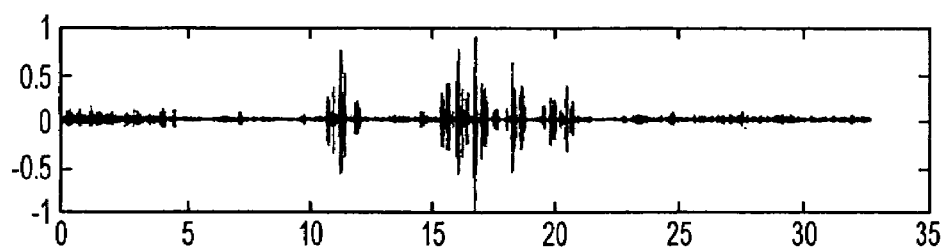

After processing, the processor 710 outputs a processed track for speaker 1 in FIG. 12A, a processed track for speaker 2 in FIG. 12B, and a processed track for speaker 3 in FIG. 12C. As shown, the signal-to-noise ratio (SNR) input into the AV system 700 is less than 0 dB. As shown in FIGS. 11A through 11C, the output from the system 700 has a SNR of 11.47 dB. After passing through the processor 710, the output shown in FIGS. 12A through 12C has a SNR of 16.75 dB. As such, according to an aspect of the invention, the post-processing of the separated channels performed in operation 564 can enhance each output channel for recording or transmission by removing the interference from adjacent tracks.

In general, motion of an object is subject to excitation and frictional forces. In what follows, $\xi$ denotes x, y, or z in Cartesian coordinates; r, $\theta$, or z in polar coordinates; and $\rho$, $\theta$, or $\phi$ in spherical coordinates. In the $\xi$ coordinates, the discrete equations of motion assuming a unit mass are given by equations (1) through (3) as follows.

$$\xi(t)=\xi(t-1)+\dot{\xi}(t)\cdot\Delta T \quad (1)$$

$$\dot{\xi}(t)=\dot{\xi}(t-1)+u'_\xi(t)\cdot\Delta T \quad (2)$$

$$\dot{\xi}(t)=\dot{\xi}(t-1)+\{u_\xi(t)-f(\xi(t))\}\cdot\Delta T \quad (3)$$

In equations (1) through (3), t is a discrete time increment, $\Delta T$ is a time interval between discrete times t, $u_\xi(t)$ is an external excitation force, and $f(\xi(t))$ is a frictional force. Assuming that $f(\xi(t))$ is linear, the frictional force can be approximated as $b\dot{\xi}$, where b is a frictional constant. As such, equations (1) through (3) can be simplified as follows in equations (4) and (5).

$$\xi(t) = \xi(t-1) + \dot{\xi}(t)\cdot\Delta T \quad (4)$$

$$\dot{\xi}(t) = \frac{\dot{\xi}(t-1) + u_\xi(t)\cdot\Delta T}{1+b\cdot\Delta T} \quad (5)$$

When there is an abrupt change in motion, the backward approximation of equation (4) to calculate the $\dot{\xi}(t)$ is erroneous. The error could be even larger when $\ddot{\xi}(t)$ is double-integrated to obtain $\xi(t)$. Thus, according to an aspect of the invention, $\xi(t+1)$ and $\dot{\xi}(t+1)$ are further incorporated to approximate $\dot{\xi}(t)$ and $\ddot{\xi}(t)$, respectively, as set forth in equations (6) and (7).

$$\dot{\xi}(t) = \frac{\xi(t+1) - \xi(t-1)}{2\Delta T} \quad (6)$$

$$\ddot{\xi}(t) = \frac{\dot{\xi}(t+1) - \dot{\xi}(t-1)}{2\Delta T} = u_\xi(t) - b\dot{\xi}(t) \quad (7)$$

Based on the above, the equations of motion for the apparatus shown in FIG. 1 are as follows in equations (8) and (9).

$$\xi(t+1)=\xi(t-1)+\dot{\xi}(t)\cdot 2\Delta T \quad (8)$$

$$\dot{\xi}(t+1)=-b\cdot 2\Delta T\cdot\dot{\xi}(t)+\dot{\xi}(t-1)+u_\xi(t)\cdot 2\Delta T \quad (9)$$

When put in matrix form, the equations of motion become equations (10) through (13) as follows:

$$\Xi(t+1) = F(t)\Xi(t) + G(t)u_\xi(t) \quad (10)$$

$$\Xi(t+1) = |\xi(t)\dot{\xi}(t)\xi(t+1)\dot{\xi}(t+1)|^T \quad (11)$$

$$F(t) = \begin{bmatrix} 0 & 0 & 1 & 0 \\ 0 & 0 & 0 & 1 \\ 1 & 0 & 0 & 2\Delta T \\ 0 & 1 & 0 & -b\cdot 2\Delta T \end{bmatrix} = \begin{bmatrix} 0 & I \\ I & F_0 \end{bmatrix} \quad (12)$$

-continued $$G(t) = \begin{bmatrix} 0 \\ 0 \\ \overline{0} \\ 2\Delta T \end{bmatrix}$$  (13)

There are two kinds of moving objects, the robot itself and target objects including human. For the robot including the apparatus shown in FIG. 1, the external force is a control command, $u(t)=[u_\xi(t)]$ and is usually known. The pose of the robot at time t will be denoted by r(t). For the robot operating in a planar environment, for example, this pose consists of the x-y position in the plane and its heading direction. It is assumed to follow a first-order Markov process specified equation (14). However, where the apparatus shown in FIG. 1 does not move, it is understood that r(t) is a constant according to an aspect of the invention.

$$p(r(t+1)|r(t),u(t))$$ (14)

The Kalman filter and any similar or successor type of filter suffice for estimating the pose. A simultaneous localization and map building (SLAM) algorithm can be used by the computer 400 to find not only the best estimate of the pose r(t), but also the map, given the set of noisy observations and controls according to an aspect of the invention. An example of such an algorithm is as set forth more fully in M. Montemerlo, "FastSLAM: A Factored Solution to the Simultaneous Localization and Mapping Problem with Unknown Data Association," Ph.D. dissertation, CMU, 2003, the disclosure of which is incorporated by reference.

The pose of a target object at time t will be denoted by s(t). Since the maneuvering behavior for the target object is not known, the external force, v(t) exerted on the target is modeled as a Gaussian function as set forth in equation (15) such that the pose of the target object is assumed by the computer 400 to follow a first-order Markov process as set forth in equation (16).

$$v(t)=N(v(t);0,\Sigma)$$ (15)

$$p(s(t+1)|s(t),v(t))$$ (16)

In regards to measurement models, an observation data set Z(t) includes a multi-channel audio stream, $z_a(t)$ with elements $z_m(t)(m=1,\ldots,m)$ observed by the $m^{th}$ microphone 210 in the time domain, and an omni-directional vision data, $z_v(t)=I(r, \theta, t)$ in polar coordinates and which is observed by camera 110. As such, the observation data set Z(t) is as set forth in equation (17).

$$Z(t)=\{z_a(t), z_v(t)\}.$$ (17)

By way of background in regards to determining the observation data set Z(t), time-delay estimates (TDE), such as those described in J. Vermaak and A. Blake, "Nonlinear Filtering for Speaker Tracking in Noisy and Reverberant Environments," in *Proc. ICASSP,* 2001; C. Choi, "Real-time Binaural Blind Source Separation," in *Proc. Int. Symp. ICA and BSS,* 2003, pp. 567-572; G. Lathoud and I. A. McCowan, "Location based Speaker Segmentation," in *Proc. ICASSP,* 2003; G. Lathoud, I. A. McCowan, and D. C. Moore, "Segmenting Multiple Concurrent Speakers using Microphone Arrays," in *Proc. Eurospeech,* 2003; R. Cutler et. al., "Distributed Meetings: A Meeting Capture and Broadcasting System," in *Proc. ACM Int. Conf. Multimedia,* 2002; and Y. Chen and Y. Rui, "Real-time Speaker Tracking using Particle Filter Sensor Fusion," *Proc. of the IEEE,* vol. 92, no. 3, pp. 485-494, 2004, the discloses of which are incorporated by reference, describe mechanisms for audio tracking. However, while usable according to aspects of the invention, even though there is a weighting function from a maximum likelihood approach and a phase transform to cope with ambient noises and reverberations, TDE-based techniques are vulnerable to contamination from explicit directional noises as noted in M. Brandstein and D. Ward, Eds., *Microphone Arrays: Signal Processing Techniques and Applications*. Springer, 2001.

In contrast, signal subspace methods have an advantage of adopting multiple-source scenarios. In addition, signal subspace methods are relatively simple and clear, and also provide high resolution and asymptotically unbiased estimates of the angles for wide-band signals. Examples of such sub-space methods are disclosed in G. Su and M. Morf, "The Signal Subspace Approach for Multiple Wide-band Emitter Location," *IEEE Trans. ASSP,* vol. 31, no. 6, pp. 1502-1522, 1983 and H. Wang and M. Kaveh, "Coherent Signal-subspace Processing for the Detection and Estimation of Angles of Arrival of Multiple Wide-band Sources," *IEEE Trans. ASSP,* vol. 33, no. 4, pp. 823-831, 1985, the disclosures of which are incorporated by reference. Thus, according to an aspect of the invention, the method of FIG. 2 and the computer 400 utilize the subspace approach instead of the TDE. However, without loss of generality, it is understood that the TDE-based methods can be used in addition to or instead of signal subspace methods, and that the TDE-based methods can also work in the framework of the recursive Bayesian filtering of an aspect of the invention.

By way of background in regards to determining the observation data set Z(t), the method of FIG. 2 and the computer 400 perform object detection by comparing images using Hausdorff distance according to an aspect of the invention. Examples of the Hausdorff distance are described in D. P. Huttenlocher, G. A. Klanderman, and W. J. Rucklidge, "Comparing Images Using the Hausdorff Distance under Translation," in *Proc. IEEE Int. Conf CVPR,* 1992, pp. 654-656, the disclosure of which is incorporated by reference. While this method is simple and robust under scaling and translations and is therefore useable in the present invention, the method consumes considerable time to compare all the candidate images of various scales.

According to another aspect of the invention, for more rapid computation, a boosted cascade structure using simple features is used. An example of the boosted cascade structure was developed and described in P. Viola and M. Jones, "Rapid Object Detection Using a Boosted Cascade of Simple Features," in *Proc. CVPR,* 2001, the disclosure of which is incorporated by reference. An additional example is described in the context of a pedestrian detection system and combines both motion and appearance in a single model as described in P. Viola, M. Jones, and D. Snow, "Detecting Pedestrians using Patterns of Motion and Appearance," in *Proc. ICCV,* 2003, the disclosure of which is incorporated by reference. While usable in the present invention, the boosted cascade structure is efficient in a sense of speed and performance, but needs an elaborate learning and a tremendous amount of training samples.

In performing identification of objects, color is a suitable identification factor according to an aspect of the invention. In the context of detecting people, skin color has been found to be an attractive visual cue to find a human. Examples of such findings are found as described in M. Jones and J. M. Rehg, "Statistical Color Models with Application to Skin Detection," *International Journal of Computer Vision,* 2002, the disclosure of which is incorporated by reference. Accordingly, while the Hausdorff distance and boosted cascade structures are usable according to aspects of the invention, the computer 400 according to an aspect of the invention uses skin-color detection to speed up the computation and simple appearance models to lessen the burden to the elaborate learning. However, it is understood that for humans or other objects, other colors can be used as visual cues according to aspects of the invention.

Tracking has long been an issue in aerospace engineering, as set forth in Y. Bar-Shalom and X.-R. Li, *Multitarget-multisensor Tracking: Principles and Techniques*, Yaakov Bar-Shalom, 1995, the disclosure of which is incorporated by reference. Recent developments have occurred in the field in regards to performing object tracking in vision. Examples of such methods include a mean shift method, a CAMSHIFT method, and CONDENSATION algorithms. Examples of these methods are described in D. Comaniciu, V. Ramesh, and P. Meer, "Real-time Tracking of Non-rigid Objects using Mean Shift," in *Proc. CVPR*, 2000; "Kernel-based Object Tracking," *IEEE Trans. PAMI*, 2003; G. R. Bradski, "Computer Vision Face Tracking for use in a Perceptual User Interface," *Intel Technology Journal*, 1998; M. Isard and A. Blake, "Contour Tracking by Stochastic Propagation of Conditional Density," in *Proc. ECCV*, 1996; and "Icondensation: Unifying Low-level and High-level Tracking in a Stochastic Framework," in *Proc. ECCV*, 1998, the disclosures of which are incorporated by reference.

Additionally, there has been an increase in interest particle filter tracking as set forth in Y. Chen and Y. Rui, "Real-time Speaker Tracking using Particle Filter Sensor Fusion," *Proc. of the IEEE*, 2004, the disclosure of which is incorporated by reference. In contrast, sound emitter tracking is a less popular, but interesting topic and is described in J. Vermaak and A. Blake, "Nonlinear Filtering for Speaker Tracking in Noisy and Reverberant Environments," in *Proc. ICASSP*, 2001, the disclosure of which is incorporated by reference.

For localization and tracking, an aspect of the present invention utilizes the celebrated recursive Bayesian filtering. This filtering is primitive and original and, roughly speaking, the other algorithms are modified and approximate versions of this filtering.

As shown in FIG. 1, the microphones 210 in the microphone array is a sound source localizer because it is isotropic in azimuth and can find the angles of arrival from sound sources of all directions. The subspace approach used by the computer 400 according to an aspect of the invention is based upon a spatial covariance matrix from the observed signals via ensemble average over an interval assuming that their estimation parameters (i.e. the angles between an array microphone 210 and each speaker are fixed).

The observed audio data is given by an m-dimensional vector (m sensors) in the frequency domain as follows in equation (18). As shown in FIG. 1, the array of microphones includes eight (8) microphones 210 such that m=8 in the shown example. However, it is understood that other values for m can be used based on other numbers of microphones 210.

$$z_a(f,t) = A(f,\theta)x(f,t) + n(f,t) \tag{18}$$

In equation (18), $z_a(f, t)$ is an observation vector of a size m×1, x(f, t) is a source vector of a size d×1, n(f, t) is a measurement noise vector of a size m×1 at frequency f and discrete time t. $A(f, \theta)$ is a transfer function matrix including steering vectors $a(f, \theta)$. Steering vectors $a(f, \theta)$ represent attenuation and delay reflecting the propagation of the signal source at direction $\theta$ to the array at frequency f. According to an aspect of the invention, the steering vectors $a(f, \theta)$ are experimentally determined for a microphone array configuration by measuring a response to an impulse sound made at 5° intervals. However, it is understood that the vector $a(f, \theta)$ can be otherwise derived.

A spatial covariance matrix for observations is obtained for every consecutive frame by $R(f)=E\{z_a(f,t)\cdot z_v(f,t)^H\}$, where "$H$" denotes the Hermitian transpose. A spatial covariance matrix N(f) was pre-calculated when there were no explicit directional sound sources. Therefore, solving the generalized eigenvalue problem as set forth in equation (19) results in a generalized eigenvalue matrix, $\Lambda$ and its corresponding eigenvector matrix, $E=[E_S|E_N]$. $E_S=[e_s^1, \ldots, e_s^d]$ and $E_N=[e_N^{d+1}, \ldots, e_N^m]$ are matrices of eigenvectors which span a signal subspace and a noise subspace, respectively. "d" is an approximation of a number of sound sources and can be present at an assumed number (such as three (3)). While not required, it is possible that "d" can be input based on the number of people who will be tracked. However, it is noted that the generalized eigenvalue problem could be replaced by any other eigenanalysis method according to aspects of the invention. Examples of such methods include, but are not limited to, the eigenvalue problem, the singular value decomposition, and the generalized singular value decomposition according to aspects of the invention.

$$R(f)\cdot E = N(f)\cdot E \cdot \Lambda \tag{19}$$

The conditional likelihood $p(z_a(t)|f, \theta)$ that sound sources received by the audio system 200 are present at a frequency f and angular direction $\theta$ is obtained by the computer 400 using the MUSIC (MUltiple SIgnal Classification) algorithm according to an aspect of the invention as set forth in equation (20). However, it is understood that other methods can be used. In equation (20), $a(f,\theta)$ is the steering vector at a frequency f and a direction $\theta$.

$$p(z_a(t)|f,\theta) = p(z_a(f,t)|\theta) = \frac{a^H(f,\theta)a(f,\theta)}{a^H(f,\theta)E_N(f,\theta)E_N^H(f,\theta)a(f,\theta)} \tag{20}$$

From the above, the likelihood of a particular sound source being at a particular angular direction $\theta$ is given in equations (21) through (23) as follows.

$$p(z_a(t)|\theta) = \int_f p(z_a(t),f|\theta)df \tag{21}$$

$$p(z_a(t)|\theta) = \int_f p(z_a(t)|f,\theta)p(f|\theta)df \tag{22}$$

$$p(z_a(t)|\theta) = \int_f p(z_a(f,t)|\theta)p(f)df \tag{23}$$

As set forth in equations (21) through (23), p(f|θ) is replaced by p(f) because the frequency selection is assumed to have no relation to the direction of the source signal. Assuming that the apparatus is in a discrete frequency domain and probabilities for frequency bin selection are all equal to $p(f_k)=1/N_f$, the likelihood of a direction $\theta$ of each signal source in equation (23) is then set forth in equations (24) and (25) according to an aspect of the invention in order for the computer 400 to detect the likelihood of a direction for the signal sources. In equation 25, F is a set of frequency bins chosen and $N_f$ is the number of elements in F.

$$p(z_a(t)|\theta) = \frac{\sum_{f_k \in F} P(f_k,\theta)}{N_f} \tag{24}$$

$$p(z_a(t)|\theta) = \frac{\sum_{f_k \in F} \frac{a^H(f_k, \theta) a(f_k, \theta)}{a^H(f_k, \theta) E_N(f_k, \theta) E_N^H(f_k, \theta) a(f_k, \theta)}}{N_f} \quad (25)$$

Using equation (25), the computer 400 calculated the audio likelihood as a function of angle shown in FIG. 4A. While described in terms of tracking humans, it is understood that other types of objects (such as cars, inventory items, aircraft, ships etc.) as well as animals can be tracked according to aspects of the invention. Specifically, an aspect of the present invention allows alteration of a parameter for a minimum length of the sound to be detected so as to allow other objects to be tracked using audio.

In regard to tracking multiple humans, the apparatus shown in FIG. 1 uses an omni-directional color camera 110 with a 360° field of view so that all humans are viewed simultaneously as shown in FIG. 3A. To find multiple humans, two features are used according to an aspect of the invention: skin color and image shape. Skin regions have a nearly uniform color, so the face and hand regions can be easily distinguished using color segmentation as shown in FIG. 3C. It is understood that various skin tones can be detected according to aspects of the invention so as to allow the tracking of multiple races and skin colors. To determine whether a skin-colored blob is a human or not, three shapes from the upper body are incorporated and used by the computer 400 according to an aspect of the invention.

Specifically, an input color image, such as that shown in FIG. 3A, is converted by the computer 400 into two images: a color-transformed and thresheld image and an edge image as shown in FIG. 3C and FIG. 3B, respectively. The first image (i.e., such as the example shown in FIG. 3C) is generated by a color normalization and a color transform following a thresholding. Specifically, $$r = \frac{R}{R+G+B}; g = \frac{G}{R+G+B}; b = \frac{B}{R+G+B}.$$

The color transform is expressed as a 2D Gaussian function, $N(m_r, \sigma_r; m_g, \sigma_g)$, where $(m_r, \sigma_r)$ and $(m_g, \sigma_g)$ are the mean and standard deviation of the red and green component, respectively. The normalized color reduces the effect of the brightness, which significantly affects color perception processing, while leaving the color components intact. A transformed pixel has a high intensity when the pixel value gets close to a color associated with skin. The thresholding by the color associated with skin produces the first image. However, it is understood that, where other colors are chosen or in order to capture additional skin tones, the transformation can be adapted to also have a high intensity at other chosen colors in addition to or instead of the shown skin tone.

The second image (i.e., such as the example shown in FIG. 3B) is the average of three edge images: red, green, and blue. Based on the size and a center-of-gravity of each skin-colored blob in the color-transformed and thresheld image (i.e., such as the example shown in FIG. 3C), the computer 400 obtains size-normalized candidates for the human upper-body in the edge image. However, it is understood that other template edge images can be used instead of or in addition to the upper body edge image according to aspects of the invention, and that the edge image can be otherwise normalized. By way of example, if the targeted object can include animals or other objects (such as cars, inventory items, aircraft, ships etc.), the template would reflect these shapes or portions thereof useful in identifying such objects or animals visually.

For human shape matching according to an aspect of the invention, the computer 400 uses three shape model images (i.e., edge image templates) of the human upper-body in accordance with human poses. The three shape model images used include a front, a left-side, and a right-side view. To calculate the similarity between a shape model image and the candidate edge image, the computer 400 measures the Hausdorff distance between the shape model image and the candidate edge image. The Hausdorff distance defines a measure of similarity between sets. An example of the Hausdorff distance is set forth in greater detail in D. P. Huttenlocher, G. A. Klanderman, and W. J. Rucklidge, "Comparing Images Using the Hausdorff Distance under Translation," in *Proc. IEEE Int. Conf. CVPR*, 1992, pp. 654-656, the disclosure of which is incorporated by reference.

The Hausdorff distance has two asymmetric distances. Given two sets of points, $A=\{a_1, \ldots, a_p\}$ being the shape model image and $B=\{b_1, \ldots, b_q\}$ being the candidate edge image, the Hausdorff distance H between the shape model A and the candidate edge image B is determined as set forth in equation 26.

$$H(A,B) = \max(h(A,B), h(B,A)) \quad (26)$$

In equation (26), $h(A,B) = \max_{a \in A} \min_{b \in B} \|a-b\|$. The function $h(A,B)$ is called the directed Hausdorff distance from A to B and identifies the point that is farthest from any point of B, and measures the distance from a to its nearest neighbor in B. In other words, the directed distance from A to B is small when every point a in A is close to some point b in B. When both are small, the computer 400 determines that the candidate edge image and the shape model image look like each other. While not required in all aspects, the triangle inequality of the Hausdorff distance is particularly useful when multiple stored shape model images are compared to an edge image obtained from a camera, such as the camera 110. With this distance, the computer 400 can detect from a video image the human upper-body and the pose of the human body using the stored poses and human torso images. Hence, the method performed by the computer 400 detects multiple humans in cluttered environments that have illumination changes and complex backgrounds as shown in FIGS. 3A through 3C.

According to an aspect of the invention, the computer 400 determines a likelihood function for the images detected through the video system 100 using a Gaussian mixture model of 1D Gaussian functions centered at the center-of-gravity $\theta_i$ of each detected human i. A variance $\sigma_i^2$ generally reflects a size of the person (i.e., the amount of angle θ taken up by human i from the center of gravity at $\theta_i$). The variance $\sigma_i^2$ is an increasing function of the angular range of the detected human. Therefore, the probability for the video images being a human to be targeted is set forth in equation (27).

$$p\left(z_v(t) \,\middle|\, \theta\right) = \sum_i \alpha_i N(\theta_i, \sigma_i^2) \quad (27)$$

In equation (27), $\alpha_i$ is a mixture weight for the candidate image and is a decreasing function of the Hausdorff distance (i.e., is inversely proportional to the distance H (A,B)). The decreasing value of the Hausdorff distance indicates that the candidate image matches well with one of the shape model images, indicating a strong likelihood of a match.

Additionally, in order to detect, localize, and track multiple targets, the computer 400 further performs recursive estimation of the target pose distribution for a sequence of observations $Z^t$ set forth in equation (28). The recursion performed by the computer 400 is given in equations (29) through (33) according to an aspect of the invention.

$$Z^t = \{Z(1), \ldots, Z(t)\} \quad (28)$$

$$p(s(t)|Z^t) = p(s(t)|Z(t), Z^{t-1}) \propto p(Z(t)|s(t), Z^{t-1}) p(s(t)|Z^{t-1}) \quad (29)$$

$$p(Z(t)|s(t), Z^{t-1}) = p(Z(t)|s(t)) = p(z_a(t)|s(t)) p(z_v(t)|s(t)) \quad (30)$$

$$p(s(t)|Z^{t-1}) = \int p(s(t), s(t-1)|Z^{t-1}) ds(t-1) \quad (31)$$

$$p(s(t)|Z^{t-1}) = \int p(s(t)|s(t-1), Z^{t-1}) p(s(t-1)|Z^{t-1}) ds(t-1) \quad (32)$$

$$p(s(t)|Z^{t-1}) = \int p(s(t)|s(t-1)) p(s(t-1)|Z^{t-1}) ds(t-1) \quad (33)$$

Additionally, according to an aspect of the invention, since the likelihood $p(s(t)|s(t-1))$ follows the dynamic models in equations (4) and (5) or (8) and (9) as set forth above, the likelihood $p(s(t)|s(t-1))$ can be further approximated by a Gaussian distribution according to an aspect of the invention as set forth in equation (34).

$$p(s(t)|s(t-1)) = N(s(t); s(t-1), \Sigma). \quad (34)$$

Therefore, equations (34) and (33) can be combined into a convolution integral as follows in equation (35) such that the Bayesian filtering performed by the computer 400 can be summarized as set forth in equations (36) and (37).

$$p(s(t)|Z^{t-1}) = \int N(s(t); s(t-1), \Sigma) p(s(t-1)|Z^{t-1}) ds(t-1) \quad (35)$$

$$p(s(t)|Z^{t-1}) = N(s(t); s(t-1), \Sigma) * p(s(t-1)|Z^{t-1}) \quad (36)$$

$$p(s(t)|Z^t) \propto p(z_a(t)|s(t)) p(z_v(t)|s(t)) p(s(t)|Z^{t-1}) \quad (37)$$

In equation (36), the operator * denotes the convolution operator used by the computer 400 according to an aspect of the invention. Additionally, the Bayesian recursion performed by the computer 400 includes a prediction operation and a correction operation. Specifically, the predication operation uses equation (36) to estimate the target pose based on the dynamical model for target maneuvering. The correction operation uses equation (37) in which the predicted target pose is adjusted by the likelihood of current observation.

According to an aspect of the invention, the computer 400 includes a beam-former to separate overlapping speech. In this way, the computer 400 can separate the speech of individual speakers in a conversation and tracks can be separately output for each identified speaker according to an aspect of the invention. However, it is understood that, if separate output of the speech is not required and that the apparatus only needs to identify each person, beam-forming need not be used or be used in the manner set forth below.

Speaker segmentation is an important task not only in conversations, meetings, and task-oriented dialogues, but also is useful in many speech processing applications such as a large vocabulary continuous speech recognition system, a dialog system, and a dictation system. By way of background, overlapping speech occupies a central position in segmenting audio into speaker turns as set forth in greater detail in E. Shriberg, A. Stolcke, and D. Baron, "Observations on Overlap: Findings and Implications for Automatic Processing of Multi-party Conversation," in *Proc. Eurospeech*, 2001, the disclosure of which is incorporated by reference. Results on segmentation of overlapping speeches with a microphone array are reported by using binaural blind signal separation (BSS), dual-speaker hidden Markov models, and speech/silence ratio incorporating Gaussian distributions to model speaker locations with time delay estimates. Examples of these results as set forth in C. Choi, "Real-time Binaural Blind Source Separation," in *Proc. Int. Symp. ICA and BSS*, pp. 567-572, 2003; G. Lathoud and I. A. McCowan, "Location based Speaker Segmentation," in *Proc. ICASSP*, 2003; and G. Lathoud, I. A. McCowan, and D. C. Moore, "Segmenting Multiple Concurrent Speakers using Microphone Arrays," in *Proc. Eurospeech*, 2003, the disclosures of which are incorporated by reference. Speaker tracking using a panoramic image from a five video stream input and a microphone array is reported in R. Cutler et. al., "Distributed Meetings: A Meeting Capture and Broadcasting System," in *Proc. ACM Int. Conf. Multimedia*, 2002 and Y. Chen and Y. Rui, "Real-time Speaker Tracking using Particle Filter Sensor Fusion," *Proc. of the IEEE*, vol. 92, no. 3, pp. 485-494, 2004, the disclosures of which are incorporated by reference.

These methods are the two extremes of concurrent speaker segmentation: one method depends solely on audio information while the other method depends mostly on video. Moreover, the method disclosed by Chen and Y. Rui does not include an ability to record only the speech portions of utterances and instead records all of the data regardless of whether the target person is talking and is further not able to use video data to identify an audio channel as being a particular speaker. As such, according to an aspect of the invention, the computer 400 segments multiple speeches into speaker turns and separates each speech using spatial information of the target and temporal characteristics of interferences and noises. In this way, an aspect of the present invention records and detects start and stop times for when a particular target is speaking, is able to selectively record audio and/or video based upon whether a particular person is speaking (thereby saving on memory space and/or transmission bandwidth as compared to systems which record all data), and is further able to selectively enhance particular speakers in order to focus on targets of particular interest.

According to an aspect of the invention, a linearly constrained minimum variance beam-former (LCMVBF) is used by the computer 400 to separate each target's speech from the segmented multiple concurrent speeches. The use of the beam-former poses a serious problem of potentially canceling out the target speech due to a mismatch between actual and presumed steering vectors $a(f, \theta)$. Generally, neither the actual steering vector $a(f, \theta)$ nor the target-free covariance matrix is hard to obtain. Thus, one popular approach to achieve the robustness against cancellation has been diagonal loading, an example of which is set forth in S. Shahbazpanahi, A. B. Gershman, Z.-Q. Luo, and K. Wong, "Robust Adaptive Beam-forming using Worst-case SINR Optimization: A new diagonal loading-type solution for general-rank signal," in *Proc. ICASSP*, 2003, the disclosure of which is incorporated by reference. However, this popular type of approach also has a shortcoming where the method cannot nullify interfering speech efficiently or be robust against target cancellation when the interference-to-noise ratio is low as noted in H. L. V. Trees, *Optimum Array Processing*. Wiely, 2002.

The mismatch between actual and presumed steering vectors $a(f, \theta)$ is not especially tractable in the apparatus of FIG. 1 according to an aspect of the invention. As such, the computer 400 focuses on precisely obtaining the target-free covariance matrix. Specifically, the audio-visual fusion system and method of FIGS. 1 and 2 is very accurate in allowing the beam-former to notice whether the target speech exists in the current data snapshot. This advantage is mainly due to the robustness of the subspace localization algorithm against heavy noises. Thus, the beam-former used in the computer 400 according to an aspect of the invention is able to update the covariance matrix only when the target speech is absent, so that the cancellation of target speeches can be avoided. Weights used in the beam-former are calculated by using equation (38) according to an aspect of the invention.

$$W_k = \frac{(R_k + \lambda I)^{-1} a_k(\theta_o)}{a_k^H(\theta_o)(R_k + \lambda I)^{-1} a_k(\theta_o)} \quad (38)$$

In equation (38), $\theta_o$ is the target direction, $\lambda$ is a diagonal loading factor, $R_k$ is the covariance matrix in the $k^{th}$ frequency bin for target free intervals, and $a_k(\theta_o)$ is the steering vector for the target direction in the $k^{th}$ frequency bin. In equation (38), the diagonal loading factor, $\lambda I$ further mitigates the cancellation of the target signal due to a slight mismatch of actual and presumed steering vectors.

By way of example, FIGS. 11A through 11C shown a beam-formed output detected from the eight channel audio input detected using eight microphones 210. As shown in FIGS. 11A through 11C, the beam-former of the computer 400 isolated the speakers 1 through 3 so as to take the eight channels of audio input, in which the three speakers were speaking simultaneously, from the microphones 210, and output speaker-localized outputs in the three channels shown in FIGS. 11A through 11C.

According to a further aspect of the invention, while the video likelihood is described as being calculated using input from an omnidirectional camera 110, it is understood that the video likelihood can be calculated using other cameras having a limited field of view. Examples of such limited field of view cameras include television, camcorders, web-based cameras (which are often mounted to a computer), and other cameras which individually capture only those images available to the lens when aimed in a particular direction. For such limited field of view systems, the likelihood function can be adapted from equations (6) and (7) of J. Vermaak and A. Blake, "Nonlinear Filtering for Speaker Tracking in Noisy and Reverberant Environments," in *Proc. ICASSP*, 2001, the disclosure of which is incorporated by reference. Specifically, the resulting equation is of a form of equation (39) set forth below.

$$L(video|\theta) \nabla L(video|\theta) * P(detection) + constant. \quad (39)$$

Generally, in order to aid in the direction detecting, at least two microphones should be used according to an aspect of the invention. Thus, an aspect of the present invention can be implemented using a desktop computer having a limited field of view camera (such as a web camera) disposed at a midpoint between two microphones.

Moreover, where a sound source is located outside of the field of view, the likelihood function can be adjusted such that the sound source is given an increasing likelihood of being a target to be tracked if located outside of the field of view in order to ensure that the object is tracked (such as using the constant of equation (39)). Using this information, the sound source can be tracked. Further, the computer 400 can control the camera to rotate and focus on the noise source previously outside the field of view and, if the noise source is determined not to be tracked, the beam-forming process can be used to exclude the sound source according to aspects of the invention. Alternately, if the objects outside of the field of view are to be ignored, the computer 400 can be programmed to give the sound source location a decreasing likelihood.

As a further embodiment, equation (39) can be used to synthesize multiple cameras having limited fields of view using a coordinate transform. Specifically, where the microphone array is disposed in a predetermined location, a global coordinate is disposed in a center of the array. Each camera is then assigned a coordinate relative to the global coordinate, and the computer 400 uses a coordinate transform to track objects using the plural cameras and the microphone array without requiring an omnidirectional camera.

According to an aspect of the invention in regards to operation 562, the speech pattern identification (SPI) is performed by the computer 400 using equations (40) through (48) as set forth below. Specifically, for each output track, the computer 400 detects a probability that the person is speaking as opposed to being silent. As shown in the separate channels in FIGS. 6A through 6C, each of three speakers has periods of speaking and periods of quiet. Certain of the speeches overlap, which is to be expected in normal conversation. In order to isolate when each person has begun and stopped speaking, an inner product Y(t) is calculated using a likelihood that a particular speaker is speaking L(t) (as shown in FIGS. 5A through 5C) as set forth in equation (40).

$$Y(t) = L(t)^T L(t-1) \quad (40)$$

Using this inner product, a hypothesis is created having two states based upon whether speech is present or absent from a particular track. Specially, where speech is absent, $H_o$ is detected when Y=N, and where speech is present, $H_1$ is detected when Y=S. A density model for whether speech is absent is in equation (41) and a density model for whether speech is present is in equation (42). Both density models model the probability that the speech is absent or present for a particular speaker (i.e., track) at a particular time.

$$p(Y|H_0) = \frac{1}{\sqrt{2\pi\sigma_N^2}} \exp\left(-\frac{(Y-m_N)^2}{2\sigma_N^2}\right) \quad (41)$$

$$p(Y|H_1) = \frac{1}{\sqrt{2\pi\sigma_S^2}} \exp\left(-\frac{(Y-m_S)^2}{2\sigma_S^2}\right) \quad (42)$$

Using the density models, the computer 400 determines the ratio of the densities to determine if speech is present or absent for a particular audio track at a particular time. The presence of speech is based upon whether the ratio exceeds a predetermined constant η as set forth in equation (43).

$$\frac{p(Y|H_1)}{p(Y|H_0)} \geq \eta \quad (43)$$

If the ratio is satisfied, the computer 400 determines that speech is present. Otherwise, the computer determines that speech is absent and the recording/transmission for a particular track is stopped. Thus, the start and stop times for each particular speaker's speech can be detected and recorded by the computer 400 to develop speech envelopes (i.e., times during which speech is present in a particular audio track). While not required in all aspects of the invention, in order to prevent recording background noise or otherwise wasting storage space or transmission bandwidth, the computer 400 can delete those noises detects in the silent periods between adjacent envelopes such that only audio recorded between start and stop times of the envelopes remains in the track.

Based on the results of equation (43), it is further possible for the computer 400 to online update m and a in equations (41) and (42) according to an aspect of the invention. The update is performed using equations (44) and (45). In equations (44) and (45), λ is greater than 0 and less than or equal to 1, but is generally closer to 1 according to an aspect of the invention. Further, where equation (43) is satisfied, $m_S$ and $\sigma_S^2$ of equation (42) are updated. Otherwise, where equation (43) is not satisfied and the ratio is less than η, then $m_N$ and $\sigma_N^2$ of equation (41) are updated. In this way, the computer 400 is able to maintain the accuracy of the density model based upon the inner product of equation (40).

$$m \leftarrow \lambda m + (1-\lambda)Y \qquad (44)$$

$$\sigma^2 \leftarrow \lambda \sigma^2 + (1-\lambda)Y^2 \qquad (45)$$

Figure 6A:
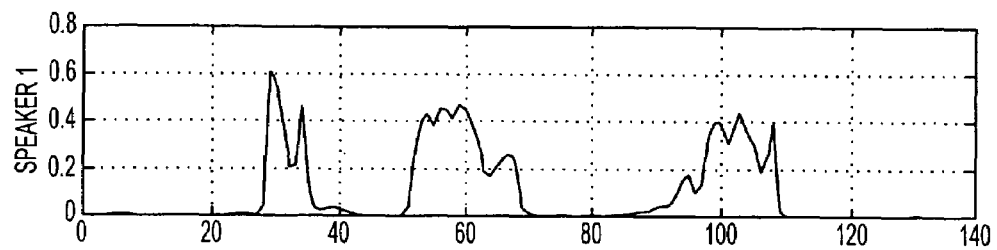
FIGS. 6A-6C show corresponding graphs of speeches for each of the speakers 1 through 3 which have been separated to form separate corresponding channels according to an aspect of the invention.
Figure 6B:
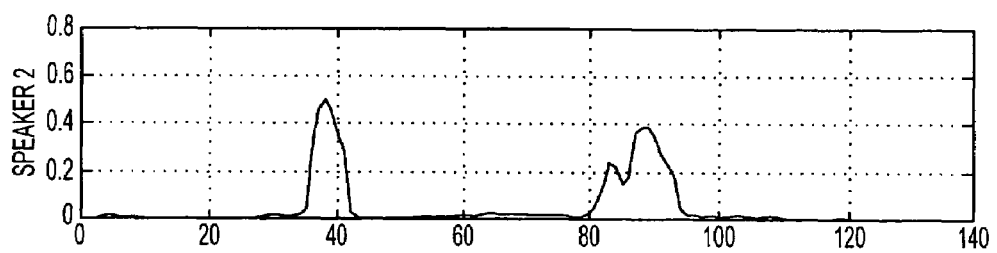
Figure 6C:
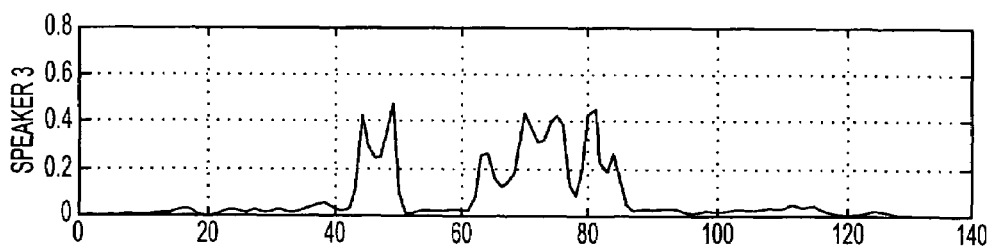
Figure 7A:
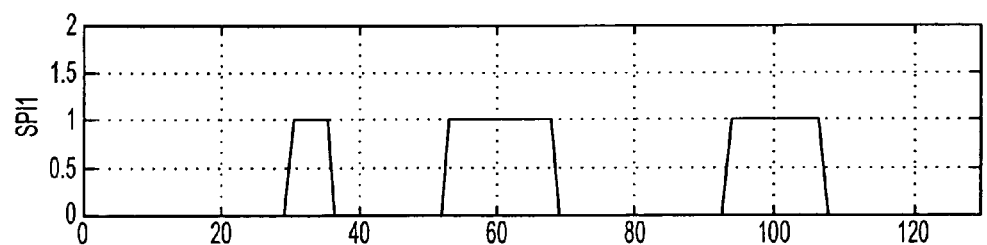
FIGS. 7A-7C show corresponding speech envelopes which define start and stop times for speech intervals based on the speeches in FIGS. 6A through 6C according to an aspect of the invention.
Figure 7B:
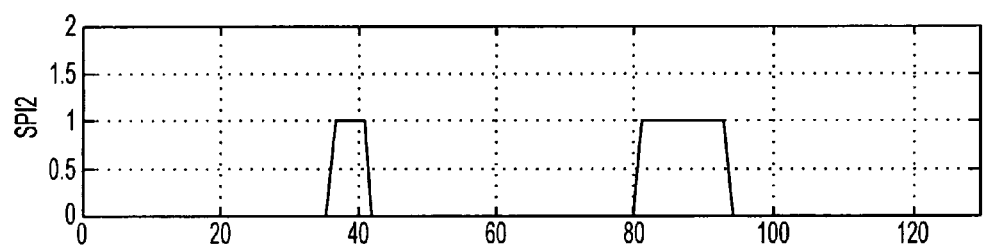
Figure 7C:
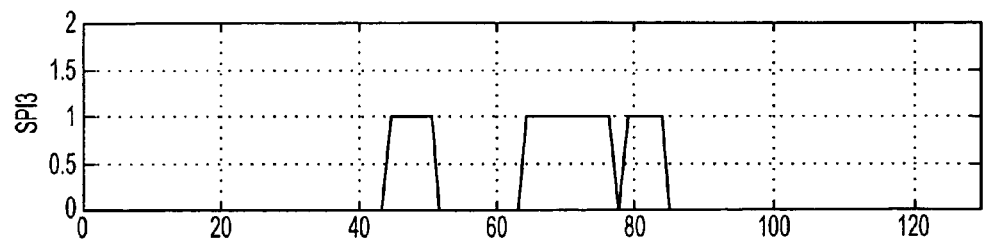

Using equations (40) through (45) according to an aspect of the invention, the speeches shown in FIGS. 6A through 6C are determined to have start and stop times indicated in FIGS. 7A through 7C. Thus, only the audio data within the shown envelopes, which indicate that speech is present (Y=S) need be recorded or transmitted.

However, as shown in FIG. 7C, a pause in an otherwise continuous speech is shown at close to time 80. As such, when recorded, there is a momentary discontinuity between the adjacent envelopes shown which can be noticeable during reproduction of the track. While this discontinuity may be acceptable according to aspects of the invention, an aspect of the invention allows the computer 400 correct the envelopes shown in FIG. 7C such that the speaker's speech is not made to sound choppy due to a speaker's pausing to take a breath or for the purposes of dramatic impact. Specifically, the computer 400 further groups speech segments separated by a small silence having a length $L_1$. For instance, the small silence could have a length $L_1$ of 4 frames. However, it is understood that other lengths $L_1$ can be used to define a pause.

The computer 400 performs a binary dilation to each detected SPI using an L-frame dilation operator in order to expand the envelope to combine adjacent speech envelopes which are sufficiently close, time wise, to be considered part of a continuous speech (i.e., within $L_1$-frames of one another). An example of an L-frame dilation operator used by the computer 400 for a binary sequence u is set forth in equation (46).

$$u = \{u_n\} \rightarrow v = f_{dil}^L(u), \text{ where } \forall n \; v_n = \max(u_{n-L}, \ldots, u_{n+L}) \qquad (46)$$

Figure 8A:
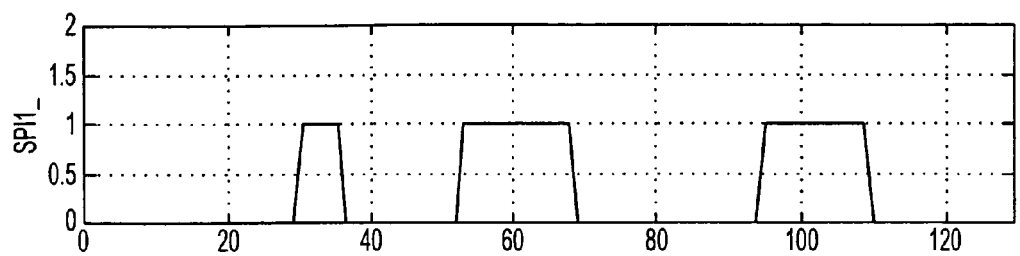
FIGS. 8A-8C show corresponding speech envelopes which have been refined to remove pauses and sudden utterances to redefine start and stop times for speech intervals based on the speech envelopes in FIGS. 7A through 7C according to an aspect of the invention.
Figure 8B:
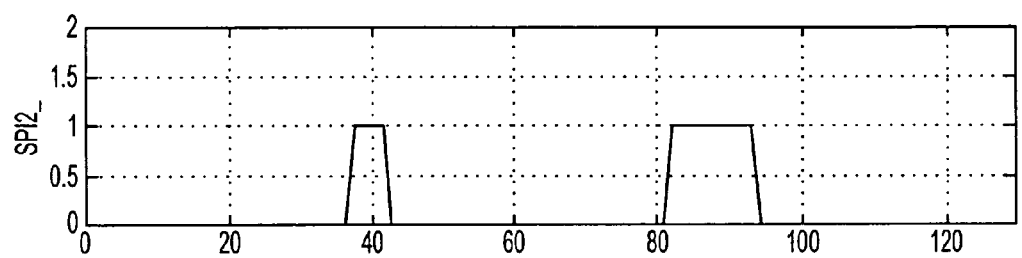
Figure 8C:
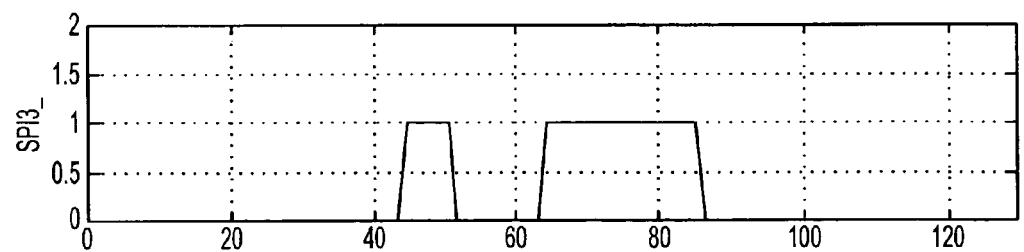

As shown in FIGS. 8A to 8C, when the computer 400 performed the dilation operation, the pause otherwise inserted at close to time 80 in FIG. 8C was removed and a combined envelope is formed such that the speech was continuously recorded for the third speaker between times just after 60 to after 80 without the pause (i.e., recording discontinuity) otherwise included before 80.

Additionally and while not required in all aspects of the invention, the computer 400 removes isolated spikes in noise that are not normally part of a conversation. By way of example, these isolated spikes of noise can be caused by coughs or other sudden outputs of noise that are not desirable to be recorded, generally. As such, while not required in all aspects, the computer 400 can also identify and remove these spikes using a binary erosion operator according to an aspect of the invention. Specifically, isolates bursts of sound for a particular speaker that are less than a predetermined time $L_2$ (such as $L_2$ being less than 2 frames) are removed. An L-frame erosion operator used by the computer 400 according to an aspect of the invention is set forth in equation (47) for a binary sequence u.

$$u = \{u_n\} \rightarrow v = f_{ero}^L(u), \text{ where } \forall n \; v_n = \min(u_{n-L}, \ldots, u_{n+L}) \qquad (47)$$

While not required in all aspects of the invention, it is understood that it is generally preferable to perform the binary dilation operator prior to the erosion operator since it is otherwise possible that pauses separating speech intervals might otherwise cause small recording envelopes. Such small envelopes could be misidentified by the erosion operator as spikes as opposed to part of a continuous speech, and therefore be undesirably erased.

In summary, according to an aspect of the invention, the computer 400 performed equations (46) and (47) using the combined equation (48) in order to provide the output shown in FIGS. 8A through 8C based upon the detected speech envelopes shown in FIGS. 7A through 7C. As can be seen in FIG. 8C, the discontinuity in the speech envelope caused by the pause close to time 80 was removed such that the entirety of the third speaker's speech was recorded without an unpleasant pause in the speech.

$$SPI\_=f_{dil}^{L2}(f_{ero}^{L1+L2}(f_{dil}^{L1}(SPI))) \qquad (48)$$

According to an aspect of the invention shown in FIG. 10, a post processor 710 performs adaptive cross-channel interference cancellation on blind source separation outputs in order to enhance the output of the computer 400 or the AV processor 700 included in the computer 400. Specifically and by way of background, separation of multiple signals from their superposition recorded at several sensors is an important problem that shows up in a variety of applications such as communications, biomedical and speech processing. The class of separation methods that require no source signal information except the number of mixed sources is often referred to blind source separation (BSS). In real recording situations with multiple microphones, each source signal spreads in all directions and reaches each microphone through "direct paths" and "reverberant paths." The observed signal can be expressed in equation (49) as follows.

$$x_j(t) = \sum_{i=1}^{N} \sum_{\tau=0}^{\infty} h_{ji}(\tau) s_i(t-\tau) + n_j(t) = \sum_{i=1}^{N} h_{ji}(t) * s_i(t) + n_j(t) \qquad (49)$$

In equation (49), $s_i(t)$ is the $i^{th}$ source signal, N is the number of sources, $x_j(t)$ is the observed signal, and $h_{ji}(t)$ is the transfer function from source i to sensor j. The noise term $n_j(t)$ refers to the nonlinear distortions due to the characteristics of the recording devices. The assumption that the sources never move often fails due to the dynamic nature of the acoustic objects. Moreover the practical systems should set a limit on the length of an impulse response, and the limited length is often a major performance bottleneck in realistic situations. As such, a frequency domain blind source separation algorithm for the convolutive mixture cases is performed to transform the original time-domain filtering architecture into an instantaneous BSS problem in the frequency domain. Using a short time Fourier transform, equation (49) is rewritten as equation (50).

$$X(\omega,n) = H(\omega) S(\omega,n) + N(\omega,n) \qquad (50)$$

For simplicity the description that follows is of a 2×2 case. However, it is understood that it can be easily extended to a general N×N case. In equation (50), ω is a frequency index, H(ω) is a 2×2 square mixing matrix, $$X(\omega, n) = [X_1(\omega, n) X_2(\omega, n)]^T \text{ and}$$

$$X_j(\omega, n) = \sum_{\tau=0}^{T-1} e^{\frac{-2\pi\omega\tau}{T}} x_j(t_n + \tau),$$

representing the DFT of the frame of size T with shift length (T/2) starting at time $$t_n = \left\lfloor \frac{T}{2} \right\rfloor (n-1) + 1$$

where "$\lfloor \ \rfloor$" is a flooring operator, and corresponding expressions apply for S($\omega$, n) and N($\omega$, n). The unmixing process can be formulated in a frequency bin $\omega$ using equation (51) as follows:

$$Y(\omega,n) = W(\omega) X(\omega,n) \quad (51)$$

In equation (51), vector Y(w, n) is a 2×1 vector and is an estimate of the original source S($\omega$, n) disregarding the effect of the noise N($\omega$, n). The convolution operation in the time domain corresponds to the element-wise complex multiplication in the frequency domain. The instantaneous ICA algorithm is the information maximization that guarantees an orthogonal solution is provided in equation (52).

$$\Delta W \propto [\phi(Y) Y^H - \text{diag}(\phi(Y) Y^H)]. \quad (52)$$

In Equation (52), "$^H$" corresponds to the complex conjugate transpose and the polar nonlinear function $\phi(\cdot)$ is defined by $\phi(Y) = [Y_1/|Y_1| \ Y_2/|Y_2|]^T$. A disadvantage of this decomposition is that there arises the permutation problem in each independent frequency bin. However, the problem is solved by using time-domain spectral smoothing.

For each frame of the $i^{th}$ BSS output, a set of all the frequency components for a frame by $Y_i(n) = \{Y_i(\omega, n) | \omega = 1, \ldots, T\}$, and two hypotheses $H_{i,0}$ and $H_{i,1}$ are given which respectively indicate the absence and presence of the primary source as set forth below in equation (53) as follows.

$$H_{i,0}: Y_i(n) = \overline{S}_j(n)$$

$$H_{i,1}: Y_i(n) = \overline{S}_i(n) + \overline{S}_j(n), i \neq j \quad (53)$$

In equation (53), $\overline{S}_i$ a filtered version of $S_i$. Conditioned on $Y_i(n)$, the source absence/presence probabilities are given by equation (54) as follows:

$$p(H_{i,m} | Y_i(n)) = \frac{p(Y_i(n) | H_{i,m}) p(H_{i,m})}{p(Y_i(n) | H_{i,0}) p(H_{i,0}) + p(Y_i(n) | H_{i,1}) p(H_{i,1})}. \quad (54)$$

In equation (54), $p(H_{i,0})$ is a priori probability for source i absence, and $p(H_{i,1}) = 1 - p(H_{i,0})$ is that for source i presence. Assuming the probabilistic independence among the frequency components, equation (54) becomes equation (55) and the sound source absence probability becomes equation (56).

$$p(Y_i(n) | H_{i,m}) = \prod_\omega p(Y_i(\omega, n) | H_{i,m}) \quad (55)$$

-continued $$p(H_{i,0} | Y_i(n)) = \left[ 1 + \frac{P(H_{i,1})}{P(H_{i,0})} \prod_\omega^T \frac{p(Y_i(\omega, n) | H_{i,1})}{p(Y_i(\omega, n) | H_{i,0})} \right]^{-1} \quad (56)$$

The posterior probability of $H_{i,1}$ is simply $p(H_{i,1} | Y_i(n)) = 1 - p(H_{i,0} | Y_i(n))$, which indicates the amount of cross-channel interference at the $i^{th}$ BSS output. As explained below, the processor 710 performs cancellation of the co-channel interference and the statistical models for the component densities $p(Y_i(\omega, n) | H_{i,m})$.

Since the assumed mixing model of ANC is a linear FIR filter architecture, direct application of ANC may not model the linear filter's mismatch to the realistic conditions. Specifically, non-linearities due to the sensor noise and the infinite filter length can cause problems in the model. As such, a non-linear feature is further included in the model used by the processor 710 as set forth in equations (57) and (58) is included in the spectral subtraction.

$$|U_i(\omega, n)| = f(|Y_i(\omega, n)| - \alpha_i b_{ij}(\omega) |Y_j(\omega, n)|), \quad (57)$$

$$\angle U_i(\omega, n) = \angle Y_i(\omega, n), i \neq j,$$

$$f(\alpha) = \begin{cases} \alpha & \text{if } \alpha \geq \varepsilon \\ \varepsilon & \text{if } \alpha < \varepsilon \end{cases} \quad (58)$$

In equations (57) and (58), $\alpha_i$ is the over-subtraction factor, $Y_i(\omega, n)$ is the $i^{th}$ component of the BSS output $Y(\omega, n)$, and $b_{ij}(\omega)$ is the cross-channel interference cancellation factor for frequency $\omega$ from channel j to i. Further, The nonlinear operator f(a) suppresses the remaining errors of the BSS, but may introduce musical noises similar to those for which most spectral subtraction techniques suffer.

If cross cancellation is successfully performed using equation (57), the spectral magnitude $|U_i(\omega, n)|$ is zero for any inactive frames. The posterior probability of $Y_i(\omega, n)$ given each hypothesis by the complex Gaussian distributions of $|U_i(\omega, n)|$ is provided in equation (59) as follows.

$$p(Y_i(\omega, n) | H_{i,m}) \simeq p(U_i(\omega, n) | H_{i,m}) \propto \exp\left[ -\frac{|U_i(\omega, n)|^2}{\lambda_{i,m}(\omega)} \right] \quad (59)$$

In equation (59), $\lambda_{i,m}$ is the variance of the subtracted frames. When m=1, $\lambda_{i,m}$ is the variance of the primary source. When m=0, $\lambda_{i,m}$ is the variance of the secondary source. The variance $\lambda_{i,m}$ can be updated at every frame by the following probabilistic averaging in equation (60).

$$\lambda_{i,m} \Leftarrow \{1 - \eta_\lambda p(H_{i,m} | Y_i(n))\} \lambda_{i,m} + \eta_\lambda p(H_{i,m} | Y_i(n)) |U_i(\omega, n)|^2 \quad (60)$$

In equation (60), the positive constant $\eta_\lambda$ denotes the adaptation frame rate. The primary source signal is expected to be at least "emphasized" by BSS. Hence, it is assumed that the amplitude of the primary source should be greater than that of the interfering source, which is primary in the other BSS output channel. While updating the model parameters, it is possible that the variance of the enhanced source, $\lambda_{i,1}$, becomes smaller than $\lambda_{i,0}$. Since such cases are undesirable, the two models are changed as follows in equation (61).

$$\sum_\omega \lambda_{i,0}(\omega) > \sum_\omega \lambda_{i,1}(\omega) \quad (61)$$

Next, the processor 710 updates the interference cancellation factors. First, the processor 710 computes the difference between the spectral magnitude of $Y_i$ and $Y_j$ at frequency $\omega$ and frame n using equations (62) through (64) as follows. Equation (63) defines a cost function J by v-norm of the difference multiplied by the frame n, and equation (64) defines the gradient-descent learning rules for $b_{ij}$.

$$\delta_i(\omega, n) = |Y_i(\omega, n)|^a - \sum_{j \neq i} b_{ij}(\omega) |Y_j(\omega, n)|^a \quad (62)$$

$$J(\omega, n) = p(H_{i,0} | Y_i(n)) |\delta_i(\omega, n)| \quad (63)$$

$$\Delta b_{ij}(\omega) \propto -\frac{\partial J(\omega, n)}{\partial b_{ij}(\omega)} = p(H_{i,0} | Y_i(n)) \text{sign}(\delta_i(\omega, n)) |Y_j(\omega, n)|^a \quad (64)$$

Using this methodology, the processor 710 provided the enhanced output shown in FIGS. 12A through 12C based upon the input shown in FIGS. 11A through 11C. However, it is understood that other types of cross cancellation techniques can be used in the processor 710 in order to improve the sound quality.

According to an aspect of the invention, the method has several strong points over other methods. One advantage is that the method is robust against noises because a subspace method with elaborately measured steering vectors is incorporated into the whole system. Another advantage comes from the three shape models for the human upper body, which, for the purposes of identifying persons, is often more adequate than the whole human body because the lower body is often occluded by other objects in a cluttered environment. However, it is understood that the lower body can be used in other environments. Moreover, a further advantage is that pose estimation is possible because the method also adopt profiles as human shape models. Such pose information is especially useful for particle filtering, but can be useful in other ways. Additionally, a further advantage is the robustness against steering vector mismatch since, while the actual steering vectors are unavailable in practice, the problem of canceling target speech can be overcome by a target-free covariance matrix with diagonal loading method, which, in turn, is possible by the accurate segmentation provided according to an aspect of the invention.

Also, an advantage of the system is the intuitive and simple sensor fusion strategy in which, using the audio-visual sensor fusion, the method can effectively keep a loudspeaker and a picture of a person separate from active speakers in order to more accurately track a desired object. Moreover, the performance can be further improved by the adaptive cross channel interference cancellation method such that the result can be directly applicable to a large vocabulary continuous speech recognition systems or a dictation machines used for distant talk to make automatic meeting records. Thus, for the speech recognition system, the proposed method serves as not only a speech enhancer but also an end point detector. However, it is understood that other aspects and advantages can be understood from the above description.

Additionally, while not required in all aspects, it is understood that the method shown in FIG. 2, or portions thereof, can be implemented using one or more computer programs encoded on one or more computer readable media for use with at least one general or special purpose computer. Also, while described in terms of visual tracking using a camera, it is understood that other types of radiation can be used to track objects such as that detected using a pyrosensor, such as a 360° pyrosensor.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus for tracking and identifying objects using received sounds and video, comprising:
   an audio likelihood module which determines corresponding audio likelihoods for each of a plurality of the sounds received from corresponding different directions based on a signal subspace and noise subspace approach, with a spatial covariance matrix that is updated only when target audio is absent, considering together a respective audio source vector, measurement noise vector, and a transform function matrix including predefined steering vectors representing attenuation and delay reflecting propagation of audio at respective directions to at least two audio sensors, each audio likelihood indicating a likelihood the sound is an object to be tracked;
   a video likelihood module which determines video likelihoods for each of a plurality of images disposed in corresponding different directions in the video, each video likelihood indicating a likelihood that the image in the video is an object to be tracked; and
   an identification and tracking module which:
   determines correspondences between the audio likelihoods and the video likelihoods,
   if a correspondence is determined to exist between one of the audio likelihoods and one of the video likelihoods, identifies and tracks a corresponding one of the objects using each determined pair of audio and video likelihoods, and
   if a correspondence does not exist between a corresponding one of the audio likelihoods and a corresponding one of the video likelihoods, identifies a source of the sound or image as not being an object to be tracked.

2. The apparatus of claim 1, wherein, when the identification and tracking module determines a correspondence between multiple pairs of audio and video likelihoods, the identification and tracking module identifies and individually tracks objects corresponding to each of the pairs.

3. The apparatus of claim 2, wherein the identification and tracking module identifies and tracks a location of each determined pair.

4. The apparatus of claim 1, wherein, for each image in the received video, the video likelihood module compares the image against a pre-selected image profile in order to determine the video likelihood for the image.

5. The apparatus of claim 4, wherein the pre-selected image profile comprises a color of an object to be tracked, and the video likelihood module compares a color of portions of the image in order to identify features indicative of an object to be tracked.

6. The apparatus of claim 4, wherein the pre-selected image profile comprises a shape of an object to be tracked, and the video likelihood module detects an outer edge of each image and compares the outer edge of each image against the shape to identify features indicative of an object to be tracked.

7. The apparatus of claim 6, wherein the pre-selected image profile further comprises poses for the object to be tracked, and the video likelihood module further compares each outer edge against each of the poses to identify features indicative of the object to be tracked.

8. The apparatus of claim 7, wherein the pre-selected image profile comprises a color of an object to be tracked, and the video likelihood module compares a color of portions of the image in order to identify features indicative of an object to be tracked.

9. The apparatus of claim 8, wherein the video likelihood module uses the identified images to normalize each outer edge in order to be closer to a size of the poses and the shape in order to identify features indicative of an object to be tracked.

10. The apparatus of claim 9, wherein the video likelihood identifies an outer edge as not being an object to be tracked if the outer edge does not correspond to the shape and the poses.

11. The apparatus of claim 9, wherein the video likelihood identifies an outer edge as not being an object to be tracked if the outer edge does not include the color.

12. The apparatus of claim 1, wherein:
a first one of the objects is disposed in a first direction,
a second one of the objects is disposed in a second direction, and
based on the correspondences between the audio and video likelihoods, the identification and tracking module identifies the first object as being in the first direction and the second object as being in the second direction.

13. The apparatus of claim 12, wherein the identification and tracking module tracks the first object as the first object moves relative to the second object.

14. The apparatus of claim 13, wherein:
the video likelihood module receives the video included the images from a camera, and
the identification and tracking module tracks and identifies the first object as the first object moves relative to the second object such that the first object crosses the second object from a perspective of the camera.

15. The apparatus of claim 1, further comprising a beam-former which, for each identified object, determines a location of the identified object, and separates from the received sounds audio corresponding to a location of each identified object so as to output audio channels corresponding uniquely to each of the identified objects.

16. The apparatus of claim 15, wherein:
the apparatus receives the sounds using a microphone array outputting a first number of received audio channels,
each received audio channel includes an element of the sounds,
the beam-former outputs a second number of the audio channels other than the first number, and
the second number corresponds to the number of identified objects.

17. The apparatus of claim 16, further comprising a recording apparatus which records each beam formed audio channel for each identified object as separate audio tracks associated with each object.

18. The apparatus of claim 15, wherein:
each output channel includes audible periods in which speech is detected and silent periods between corresponding audible periods in which speech is not detected, and
the apparatus further comprises a speech interval detector which detects, for each output channel, a start and stop time for each audible period.

19. The apparatus of claim 18, wherein the speech interval detector further:
detects a proximity between adjacent audible periods,
if the proximity is less than a predetermined amount, determines that the adjacent audible periods are one continuous audible period and connects the adjacent audible periods to form the continuous audible period, and
if the proximity is more than the predetermined amount, determines that the adjacent audible periods are separated by the silent period and does not connect the adjacent audible periods.

20. The apparatus of claim 18, wherein the speech interval detector further:
detects a length of each audible period,
if the length is less than a predetermined amount, determines that the audible period is a silent period and erases the audible period, and
if the length is more than the predetermined amount, determines that the audible period is not a silent period and does not erase the audible period.

21. The apparatus of claim 18, wherein the speech interval detector further:
for each audible period, outputs the detected speech, and
for each silent period, deletes the sound from the audio channel.

22. The apparatus of claim 15, further comprising a post processor which, for each of plural audio channels received from the beam-former, detects audio portions related to cross channel interference caused by the remaining audio channels and removes the cross channel interference.

23. The apparatus of claim 1, further comprising a controller which controls a robotic element according to the identified object.

24. The apparatus of claim 23, wherein the robotic element comprises at least one motor used to move the apparatus according to the identified object.

25. The apparatus of claim 23, wherein the robotic element comprises at least one motor used to remotely move an element connected to the apparatus through an interface according to the identified object.

26. The apparatus of claim 1, further comprising an omnidirectional camera which outputs a 360° panoramic view image to the video likelihood module.

27. The apparatus of claim 1, further comprising at least one limited field of view camera which outputs an image to the video likelihood module which has a field of view that is less than 360°.

28. The apparatus of claim 1, wherein:
the audio likelihood module further detects, for each received sound, an audio direction from which a corresponding sound is received,
the video likelihood module further detects, for each image, a video direction from which the image is observed, and
the identification and tracking module further determines the correspondences based upon a correspondence between the audio directions and the video directions.

29. The apparatus of claim 1, wherein the video received by the video likelihood module is an infrared video received from a pyrosensor.

30. A method of tracking and identifying objects using at least one computer receiving audio and video data, the method comprising:
for each of a plurality of sounds received from corresponding different directions, determining in the at least one computer corresponding audio likelihoods based on a signal subspace and noise subspace approach, with a spatial covariance matrix that is updated only when target audio is absent, considering together a respective audio source vector, measurement noise vector, and a transform function matrix including predefined steering vectors representing attenuation and delay reflecting propagation of audio at respective directions to at least two audio sensors, each audio likelihood indicating a likelihood the sound is an object to be tracked;

for each of a plurality of images disposed in corresponding different directions in a video, determining in the at least one computer video likelihoods, each video likelihood indicating a likelihood that the image in the video is an object to be tracked;

if a correspondence is determined to exist between one of the audio likelihoods and one of the video likelihoods, identifying and tracking in the at least one computer a corresponding one of the objects using each determined pair of audio and video likelihoods, and if a correspondence does not exist between a corresponding one of the audio likelihoods and a corresponding one of the video likelihoods, identifying in the at least one computer a source of the sound or image as not being an object to tracked.

31. The method of claim 30, further comprising determining correspondences between multiple pairs of audio and video likelihoods, wherein the identifying and tracking comprises individually tracking the objects corresponding to each of the determined pairs.

32. The method of claim 30, wherein the determining the video likelihoods comprises comparing each of the images against a pre-selected image profile in order to determine the video likelihoods for the corresponding images.

33. The method of claim 32, further comprising, for each determined pair, identifying a location of each determined pair.

34. The method of claim 33, wherein the pre-selected image profile comprises a color of an object to be tracked, and the determining the video likelihoods comprises comparing a color of portions of the image in order to identify features indicative of an object to be tracked.

35. The method of claim 33, wherein the pre-selected image profile comprises a shape of an object to be tracked, and the determining the video likelihoods comprises detecting an outer edge of each image and comparing the outer edge of each image against the shape to identify features indicative of an object to be tracked.

36. The method of claim 35, wherein the pre-selected image profile further comprises poses for the object to be tracked, and the determining the video likelihoods comprises comparing each outer edge against each of the poses to identify features indicative of the object to be tracked.

37. The method of claim 36, wherein the pre-selected image profile comprises a color of an object to be tracked, and the determining the video likelihoods comprises comparing a color of portions of the image in order to identify features indicative of an object to be tracked.

38. The method of claim 37, wherein the determining the video likelihoods comprises using the identified images to normalize each outer edge in order to be closer to a size of the poses and the shape in order to identify features indicative of an object to be tracked.

39. The method of claim 38, wherein the determining the video likelihoods comprises determining that an outer edge of the image does not correspond to an object to be tracked if the outer edge does not correspond to the shape and the poses.

40. The method of claim 38, wherein the determining the video likelihoods comprises determining that an outer edge of the image does not correspond to an object to be tracked if the outer edge does not include the color.

41. The method of claim 30, wherein:
a first one of the objects is disposed in a first direction,
a second one of the objects is disposed in a second direction, and
the method further comprises:
determining that a correspondence exists between a first pair of the audio likelihoods and one of the video likelihoods and that another correspondence exists between a second pair of the one of the audio likelihoods and one of the video likelihoods, and
based on the correspondences between first and second determined pairs of the audio and video likelihoods, identifying the first object as being in the first direction using the first pair and the second object as being in the second direction using the second pair.

42. The method of claim 41, wherein method further comprising tracking the first object as the first object moves relative to the second object.

43. The method of claim 42, wherein:
the at least one computer receives the video included the images from a camera, and
the tracking and identifying comprises tracking and identifying the first object as the first object moves relative to the second object such that the first object crosses the second object from a perspective of the camera.

44. The method of claim 30, further comprising a performing beam-forming by, for each identified object, determining a location of the identified object, and separating from the received sounds audio corresponding to a location of each identified object so as to output audio channels corresponding uniquely to each of the identified objects.

45. The method of claim 44, wherein:
the at least one computer receives the sounds using a microphone array outputting a first number of received audio channels,
each received audio channel includes an element of the sounds,
the beam-forming comprising outputting a second number of the audio channels other than the first number, and
the second number corresponds to the number of identified objects.

46. The method of claim 45, further comprising recording each of the beam formed audio channels for each identified object as separate audio tracks associated with each object.

47. The method of claim 44, wherein:
each output channel includes audible periods in which speech is detected and silent periods between corresponding audible periods in which speech is not detected, and
the method further comprises detecting a speech interval by, for each output channel, a start and stop time for each audible period.

48. The method of claim 47, wherein the detecting the speech interval further comprises:
detecting a proximity between adjacent audible periods,
if the proximity is less than a predetermined amount, determining that the adjacent audible periods are one continuous audible period and connecting the adjacent audible periods to form the continuous audible period, and
if the proximity is more than the predetermined amount, determining that the adjacent audible periods are separated by the silent period and does not connect the adjacent audible periods.

49. The method of claim 47, wherein the detecting the speech interval further comprises;

detecting a length of each audible period, if the length is less than a predetermined amount, determining that the audible period, is a silent period and erasing the audible period, and if the length is more than the predetermined amount, determining that the audible period is not a silent period and not erasing the audible period.

50. The method of claim 47, wherein the detecting the speech interval further comprises:

for each audible period, outputting the detected speech, and for each silent period, deleting the sound from the audio channel.

51. The method of claim 44, further comprising a post processing the beam formed audio channels by, for each of plural beam formed audio channels, detecting audio portions related to cross channel interference caused by the remaining audio channels and removing the cross channel interference.

52. The method of claim 30, further comprising controlling a robotic element according to the identified object.

53. The method of claim 52, wherein the robotic element comprises at least one motor, and the method further comprises controlling the motor to move an apparatus according to the identified object.

54. The method of claim 53, wherein the robotic element comprises at least one motor used to remotely move an element connected to the at least one computer through an interface according to the identified object.

55. The method of claim 30, wherein:

the determining the audio likelihood further comprises detecting, for each received sound, an audio direction from which a corresponding sound is received, the determining the video likelihood further comprises detecting, for each image, a video direction from which the image is observed, and the method further comprises determining the correspondences based upon a correspondence between the audio directions and the video directions.

56. A computer readable medium structure encoded with processing instructions for performing the method of claim 30 using the at least one computer.

57. A computer readable medium structure encoded with processing instructions for performing the method of claim 37 using the at least one computer.

58. A computer readable medium structure encoded with processing instructions for performing the method of claim 55 using the at least one computer.

59. The apparatus of claim 1, wherein the apparatus is configured such that the video likelihood module determines video likelihoods for each of the plurality of images disposed in the corresponding different directions in the video by determining and considering a corresponding moving direction of at least one corresponding visual sensor relative to the corresponding different directions.

60. The method of claim 31, wherein the video likelihoods are determined for each of the plurality of images disposed in the corresponding different directions in the video by determining and considering a corresponding moving direction of at least one corresponding visual sensor relative to the corresponding different directions.

* * * * *

UNITED STATES PATENT AND TRADEMARK OFFICE
CERTIFICATE OF CORRECTION

PATENT NO. : 7,536,029 B2  Page 1 of 1
APPLICATION NO. : 10/998984
DATED : May 19, 2009
INVENTOR(S) : Changkyu Choi et al.

It is certified that error appears in the above-identified patent and that said Letters Patent is hereby corrected as shown below:

Column 31, Line 36, change "claim 33," to --claim 32,--.

Column 31, Line 41, change "claim 33," to --claim 32,--.

Column 33, Line 2, change "comprises;" to --comprises:--.

Signed and Sealed this

Eleventh Day of May, 2010

David J. Kappos
*Director of the United States Patent and Trademark Office*